US012725517B2

(12) United States Patent
Oya

(10) Patent No.: US 12,725,517 B2
(45) Date of Patent: Sep. 1, 2026

(54) VEHICLE TRAVEL ROUTE PLANNING SYSTEM

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventor: Koji Oya, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 188 days.

(21) Appl. No.: 18/470,712

(22) Filed: Sep. 20, 2023

(65) Prior Publication Data

US 2024/0112577 A1 Apr. 4, 2024

(30) Foreign Application Priority Data

Sep. 26, 2022 (JP) ................................ 2022-152561
May 12, 2023 (JP) ................................ 2023-079499

(51) Int. Cl.
*G08G 1/0967* (2006.01)
*B60W 60/00* (2020.01)
(Continued)

(52) U.S. Cl.
CPC ..... *G08G 1/096725* (2013.01); *B60W 60/001* (2020.02); *G08G 1/166* (2013.01);
(Continued)

(58) Field of Classification Search
CPC .... G08G 1/096725; G08G 1/166; G08G 1/22; B60W 60/001; B60W 2554/4042; B60W 2552/10; B60W 2520/10
See application file for complete search history.

(56) References Cited

U.S. PATENT DOCUMENTS 6,049,295 A * 4/2000 Sato ...................... G08G 1/164 340/919
9,459,623 B1 * 10/2016 Raghu ............ B60W 30/18154
(Continued)

FOREIGN PATENT DOCUMENTS

JP 2002-215745 A 8/2002
JP 2003-044998 A 2/2003
JP 2015-219770 A 12/2015

OTHER PUBLICATIONS

Ohzeki, M. et al., "Control of Automated Guided Vehicles Without Collision by Quantum Annealer and Digital Devices," Front. Comput. Sci., Nov. 19, 2019, DOI:10.3389/fcomp.2019.00009.
(Continued)

*Primary Examiner* — Hussein Elchanti
(74) *Attorney, Agent, or Firm* — Posz Law Group, PLC

(57) ABSTRACT

A vehicle travel path planning system, which plans an optimal combination of travel paths for all of multiple vehicles included in a vehicle group, includes: a single path planning unit planning, as a single path, one travel path for each of the multiple vehicles; a candidate path generation unit generating multiple candidate paths similar to the single path planned for each of the multiple vehicles; and a combination search unit selecting an optimal travel path from the multiple candidate paths generated for each of the multiple vehicles and searching for an optimal travel path combination for all of the multiple vehicles included in the vehicle group.

18 Claims, 40 Drawing Sheets

(51) Int. Cl.
*G08G 1/00* (2006.01)
*G08G 1/16* (2006.01)

(52) U.S. Cl.
CPC .......... *G08G 1/22* (2013.01); *B60W 2520/10* (2013.01); *B60W 2552/10* (2020.02); *B60W 2554/4042* (2020.02)

(56) References Cited

U.S. PATENT DOCUMENTS 9,522,675 B1* 12/2016 You .................... B62D 15/0285
RE47,107 E 10/2018 Heed et al.
RE47,985 E 5/2020 Heed et al.
10,650,673 B1* 5/2020 Elsheemy .............. G08G 1/087
11,237,008 B2* 2/2022 Paruchuri ........ G08G 1/096811
2006/0155427 A1* 7/2006 Yang ........................ G08G 1/07 701/1
2007/0030212 A1* 2/2007 Shibata ..................... G06T 5/50 345/9
2010/0117861 A1* 5/2010 Free ..................... G08G 1/0104 340/929
2010/0256852 A1* 10/2010 Mudalige ............... G08G 1/163 701/24
2011/0068950 A1* 3/2011 Flaherty ................. G08G 1/096 340/905
2011/0184622 A1* 7/2011 Yamada ................ B60W 40/02 701/99
2013/0018572 A1* 1/2013 Jang ....................... G08G 1/164 701/119
2013/0110385 A1 5/2013 Heed et al.
2013/0110393 A1 5/2013 Heed et al.
2013/0211656 A1* 8/2013 An ....................... G05D 1/0274 701/25
2015/0243165 A1* 8/2015 Elsheemy ........ G08G 1/096775 340/906
2016/0148511 A1* 5/2016 Shibata .................. G08G 1/166 701/119
2016/0161271 A1* 6/2016 Okumura ........ B60W 30/18154 701/25
2016/0200334 A1* 7/2016 Hilleary ................... G08G 1/04 246/218
2016/0328963 A1* 11/2016 Yao ...................... G08G 1/0133
2017/0358025 A1* 12/2017 Varma .................. G06Q 20/145
2018/0096596 A1* 4/2018 Lee .................. G08G 1/096791
2018/0188745 A1* 7/2018 Pilkington ............... G08G 1/22
2018/0204450 A1* 7/2018 Song .................... G08G 1/0145
2018/0290745 A1 10/2018 Kumada
2018/0299882 A1* 10/2018 Kichkaylo ....... G05B 19/41895
2018/0345955 A1* 12/2018 Kim .................. B62D 15/0285
2019/0031193 A1 1/2019 Kojima
2019/0286145 A1* 9/2019 LaFary ................ G05D 1/0255
2020/0026284 A1* 1/2020 Hiramatsu ........... G08G 1/0125
2020/0097022 A1 3/2020 Miki et al.
2020/0098269 A1* 3/2020 Wray .................... B60W 30/10
2020/0307616 A1* 10/2020 Nithiyanantham .......................... G02B 27/0093
2020/0327768 A1* 10/2020 Rossano ................. E01F 13/02
2020/0342760 A1* 10/2020 Vassilovski ............. H04W 4/46
2021/0018912 A1* 1/2021 Dymesich ............. G06F 3/0482
2021/0150429 A1* 5/2021 Atanasiu ............ G01C 21/3438
2022/0277651 A1 9/2022 Wada et al.
2022/0388505 A1* 12/2022 Sharma Banjade ......................... G08G 1/096783
2022/0414518 A1* 12/2022 You ........................ G06Q 10/04
2024/0112577 A1* 4/2024 Oya ....................... G08G 1/166
2024/0378994 A1* 11/2024 Lacaze ................. G08G 1/0145

OTHER PUBLICATIONS

G.T.M. Obayashi, “Real-Time Autonomous Car Motion Planning using NMPC with Approximated Problem Considering Traffic Environment,” International Federation of Automatic Control, 2018, https://www.sciencedirect.com/science/article/pii/S2405896318326806.

Nikkei Electronics 2021. 9, pp. 19, 26, 68 ( and Excerpt English translation).

“Autonomous driving safety evaluation framework ver1.0,” Japan Automobile Manufacturers Association Inc., p. 13, Oct. 2020, https://www.jama.or.jp/safe/automated_driving/pdf/framework.pdf (and English translation of p. 13).

* cited by examiner

VEHICLE A
VEHICLE B
POSITION
SPEED
MOVEMENT INTENTION
11
SINGLE PATH PLAN PROCESS
12
CANDIDATE PATH GENERATION PROCESS
13
COMBINATION SEARCH PROCESS
14
FOLLOWING CONTROL

FIG. 7

$$H(\sigma) = -\sum_{i<j} j_{ij}\sigma_i\sigma_j - \sum_{i=1}^{N} h_i\sigma_i$$

(1) Definition of $\sigma_i$, $\sigma_j$ (formulation)
⇒ $\sigma_i$, $\sigma_j$ indicates a path for each vehicle. A position, a speed, and the like at each time are determined from it.

(2) Definition of $j_{ij}$ (formulation)
⇒ $j_{ij}$ indicates a constraint and a cost index for a combination of planned paths of respective vehicles at the same time (compatibility of combination of individual planned paths).

(3) Definition of hi (formulation)
⇒ hi indicates constraint and cost index for the single planned path of each vehicle (desirability of a single planned path).

<<Definitions of main symbols in the present disclosure>>
m: index of vehicle, minimum value =1, maximum value $=m^{max}$.
n: index of individual path of a certain vehicle, minimum value =1, maximum value $=n^{max}$.
i, j: index of path (pseudo qubit), minimum value =1, maximum value $=m^{max}*n^{max}$.
xi(k), yi(k): position of the i-th path selection (n-th path of the m-th vehicle) at time k.
$\dot{x}i(k), \dot{y}i(k)$: speed of the i-th path selection (n-th path of the m-th vehicle) at time k.
Mi: weight of the i-th path at time k.
Vi(k): speed of the i-th path at time k.

$\sigma_i$ is assigned with selection of path [1], [2], [3], [4], [5] by each vehicle A, B, C.

$x_{ij}$: the j-th path candidate of i-th vehicle.
$\sigma_i$: allocate elements of $x_{ij}$ in order.
$x_i$*: for $x_i$*, a constraint is applied such that only one element is set to have value of 1, and remaining elements are set to 0
(a constraint that one vehicle must necessarily select one path)

When generalized, $x_A(K)$
$y_A(K)$
$\dot{x}_A(K)$
$\dot{y}_A(k)$ k indicates an index assigned to time.

FIG. 11

The number of vehicles is defined as N, state of i-th vehicle at time k is defined as $x_i(k) = ((Xi(k), Yi(k), Vi(k), \theta i(k), Ki(k))$, An operation of vehicle is defined as $u_i(k) = (u_{a,i}(k), u_{K,i}(k))$.

The multiple vehicle path planning problem can be defined as follows.

$$\text{Mnimize} \quad \sum_{i=1}^{N} L(x_i, u_i) + \sum_{i=1}^{N} \sum_{j=i+1}^{N} Q((x_i, u_i), (x_j, u_j))$$

Subject to $(x_i, u_i)$ follows equation of motion of vehicle.

right-side formula is obtained from left-side formula.

$$\Rightarrow H(\sigma) = -\sum_{i<j} J_{ij}\sigma_i\sigma_j - \sum_{i=1}^{N} h_i\sigma_i$$

Solved by quantum inspired machine.

$L(x_i, u_i)$ is the cost function of a single path, and $Q((x_i, u_i), (x_j, u_j))$ is the cost function of path pair.

Respectively defined by the following formulas.

$$L(x_i, u_i) = \sum_k E_i(k) + L_{lat,i}(k) + L_{vel,i}(k) + L_{cur,i}(k) + L_{yaw,i}(k) + L_{acc,i}(k) + L_{\kappa,i}(k)$$

$$Q((x_i, u_i), (x_j, u_j)) = \sum_k \tau(L_i(k) - L_j(k)) \cdot (w_{ttc} \cdot L_{ttc,i,j}(k) + w_{thw} \cdot L_{thw,i,j}(k))$$

FIG. 12

$L_{lat}$ (k): a value evaluating whether the vehicle is traveling correctly in a middle area of the road.
$L_{dist}$ (k): a value evaluating whether the vehicle maintains a constant distance from another vehicle.
$L_{vel}$ (k): a value evaluating whether the speed of vehicle is equal to a recommended speed.
$L_{cur}$ (k): a value evaluating whether a curvature of the vehicle is equal to a recommended curvature.
$L_{yaw}$ (k): a value evaluating whether a yaw angle of the vehicle is equal to a recommended yaw angle.
$L_{acc}$ (k): a value evaluating a penalty for an acceleration operation of the vehicle.
$L_{K}$ (k): a value evaluating a penalty for a steering wheel operation of the vehicle.

Related art: G. T. M. Obayashi, "Real-Time Autonomous Car Motion Planning using NMPC with Approximated Problem Considering Traffic Environment," International Federation of Automatic Control, 2018.

Extended to multiple vehicles.

$$L_{dist,\ total}(k) = \sum_{i=1}^{N} \sum_{j=i+1}^{N} \tau\,(L_i(k) - L_j(k)) \cdot (w_{ttc} \cdot L_{ttc,\ i,\ j}(k) + w_{thw} \cdot L_{thw,\ i,\ j}(k))$$

Energy loss is added.

$$E_i(k) = \sum_{k} \eta_k \cdot \left| \frac{1}{2} M_i V_i(k+1)^2 - \frac{1}{2} M_i V_i(k)^2 \right|$$

FIG. 13

Cost function: one vehicle must select one travel path.

$x_{mn}$ is assigned with $x_{mn}=1$ when the m-th vehicle selects the n-th path,
and is assigned with $x_{mn}=0$ when the m-th vehicle does not select the n-th path.

$$H(\sigma_i) = \sum_{m=1}^{m_{max}} \left( \sum_{n=1}^{n_{max}} x_{mn} - 1 \right)^2$$

$$\sigma = [x_{11}, x_{12}, x_{13}, x_{14}, x_{15}, x_{21}, x_{22}, x_{23}, x_{24}, x_{25}, x_{31}, x_{32}, x_{33}, x_{34}, x_{35}]^T$$ is defined.

$x_{ik}$ is assigned with 1 when the i-th vehicle selects the k-th path,
and is assigned with 0 when the i-th vehicle does not select the k-th path.

For example, vehicles A, B, and C are represented by m=1, m=2, m=3.
Paths [1], [2], [3], [4], [5] of vehicle C are represented as (m=3, n=1), (m=3, n=2), (m=3, n=3), (m=3, n=4), (m=3, n=5).

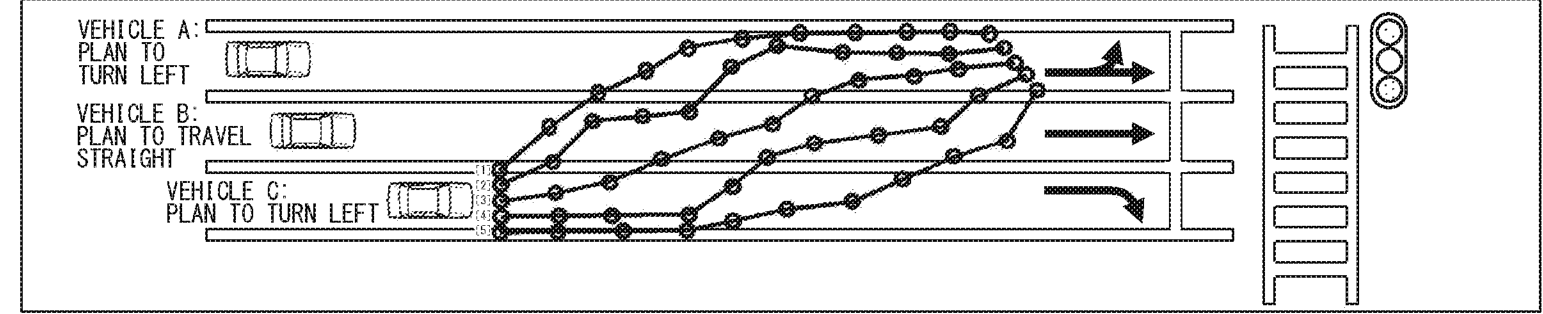

FIG. 14

Cost function: obtaining a combination of safe and secure travel paths in consideration of Time To Collision.

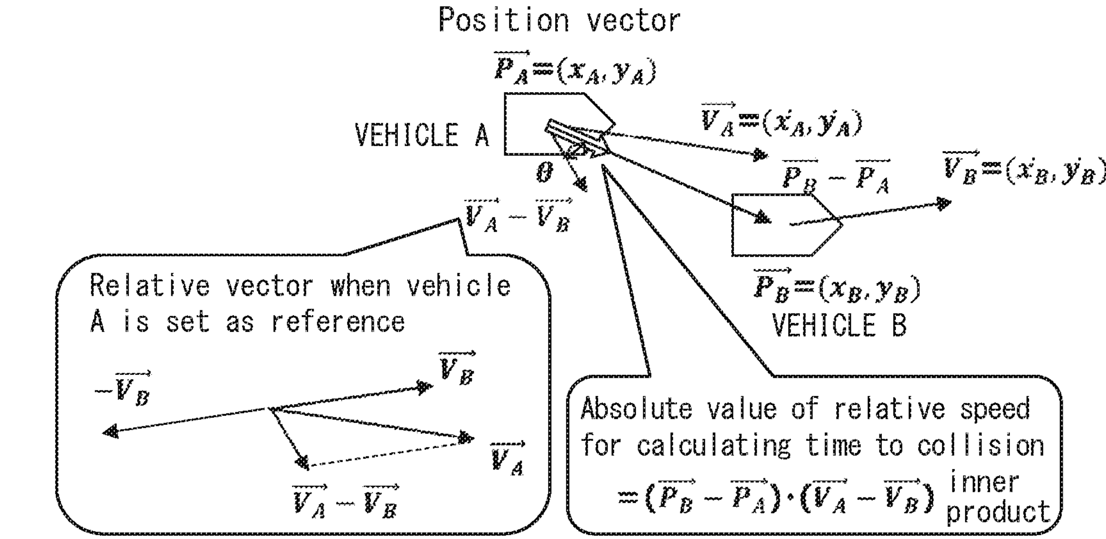

Cost function: time to collision (TTC), as large as possible.

$$\mathrm{TTC}(k)_{AB}=\frac{\text{Distance between vehicles A and B}}{\text{Relative speed between vehicles A and B}}=\frac{\{(\overrightarrow{P_B}-\overrightarrow{P_A})\cdot(\overrightarrow{P_B}-\overrightarrow{P_A})\}^{1/2}}{\{(\overrightarrow{P_B}-\overrightarrow{P_A})\cdot(\overrightarrow{V_A}-\overrightarrow{V_B})\}^{1/2}}$$

Maximization: $minTTC = min(TTC(k)_{ij})$ $$\{(\overrightarrow{P_B}-\overrightarrow{P_A})\cdot(\overrightarrow{P_B}-\overrightarrow{P_A})\}^{1/2}=\{(x_A-x_B)^2+(y_A-y_B)^2\}^{1/2}$$

$$\{(\overrightarrow{P_B}-\overrightarrow{P_A})\cdot(\overrightarrow{V_A}-\overrightarrow{V_B})\}^{1/2}=\{(x_A-x_B)(\dot{x}_A-\dot{x}_B)+(y_A-y_B)(\dot{y}_A-\dot{y}_B)\}^{1/2}$$

FIG. 16
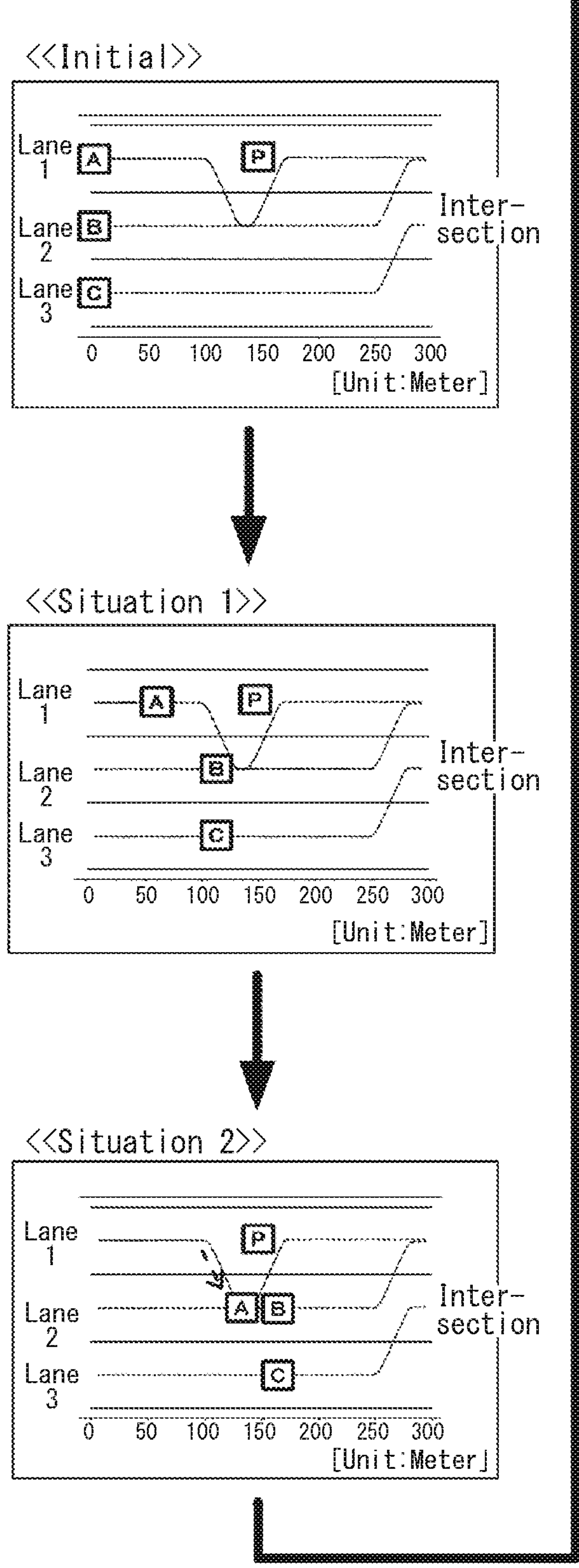
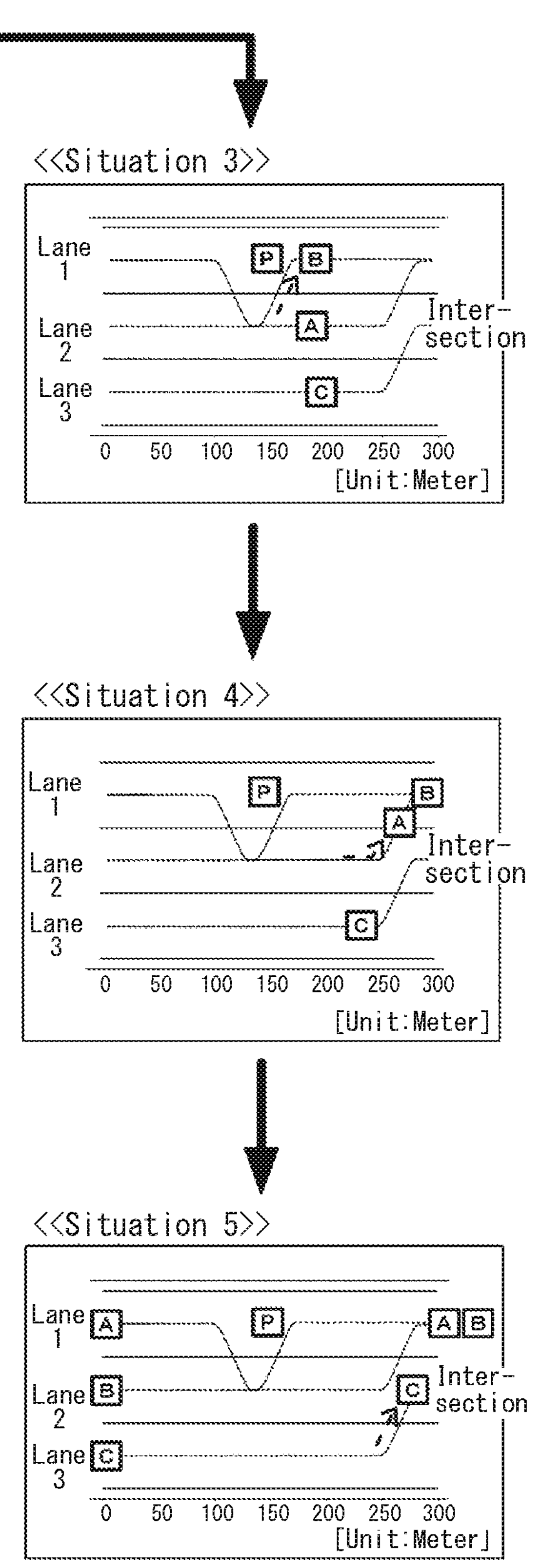

A1: Specify attribute info of vehicle A, and specify (estimate) attribute info of vehicles B and C
A2: Plan a single path of vehicle A, and plan (predict) a single path for each vehicle B, C
A3: Generate candidate paths for each vehicle A, B, C
A4: Search for path combination
A5: Perform following control along travel path of vehicle A FIG. 19
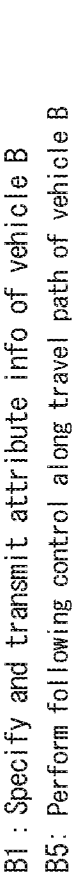
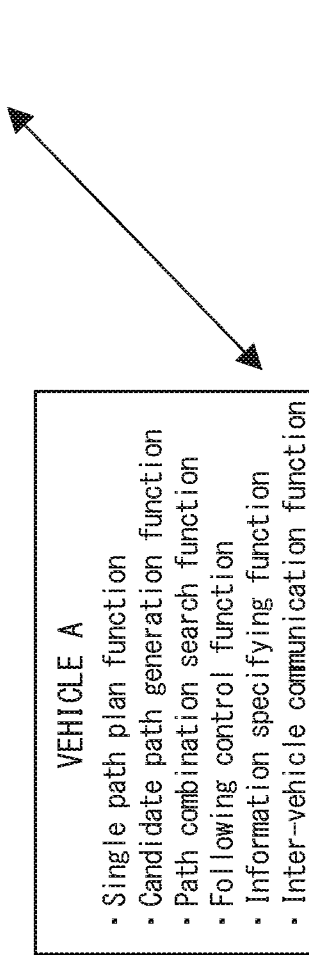

FIG. 23

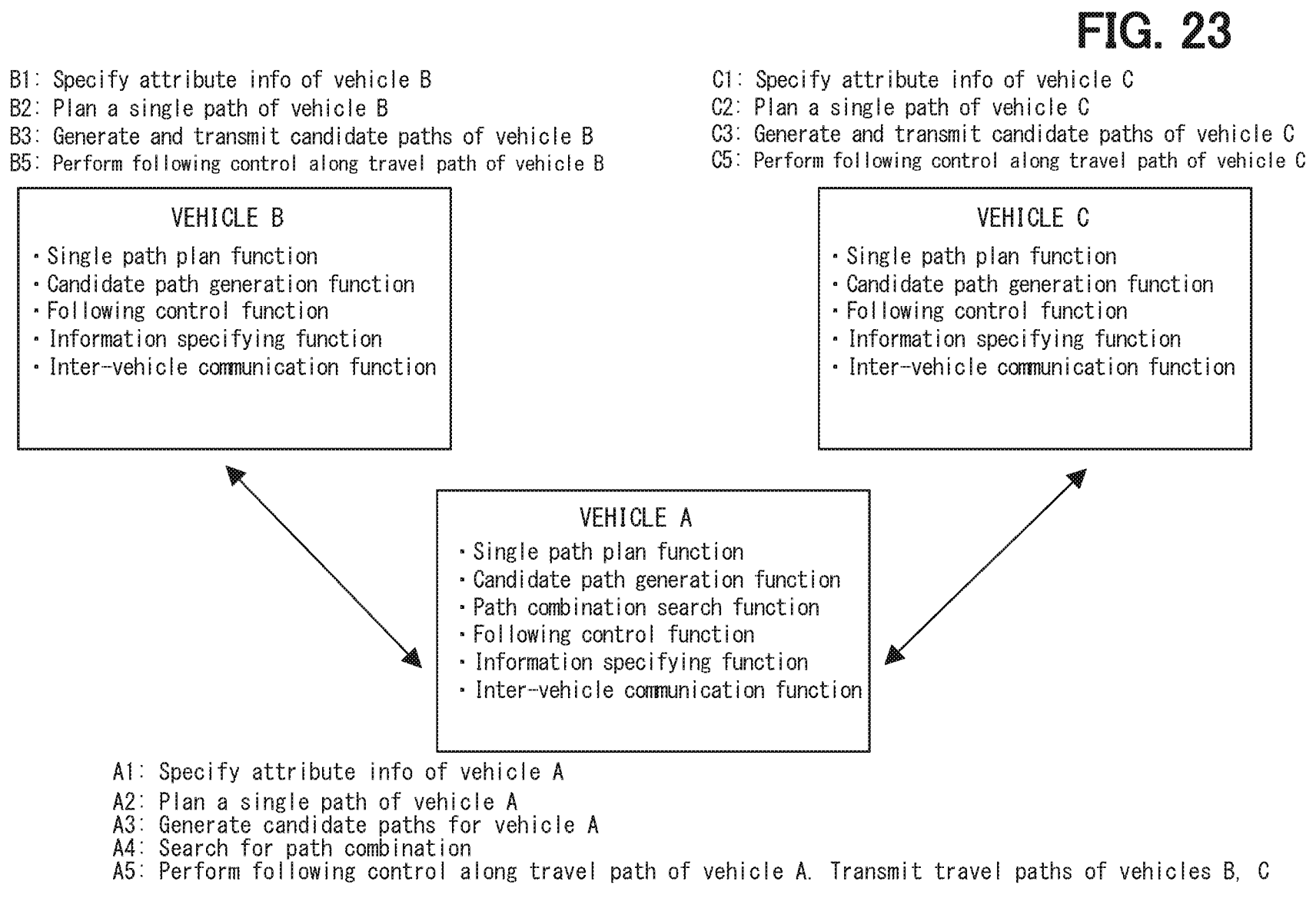

B1: Specify attribute info of vehicle B
B2: Plan a single path of vehicle B
B3: Generate and transmit candidate paths of vehicle B
B5: Perform following control along travel path of vehicle B VEHICLE B
- Single path plan function
- Candidate path generation function
- Following control function
- Information specifying function
- Inter-vehicle communication function C1: Specify attribute info of vehicle C
C2: Plan a single path of vehicle C
C3: Generate and transmit candidate paths of vehicle C
C5: Perform following control along travel path of vehicle C VEHICLE C
- Single path plan function
- Candidate path generation function
- Following control function
- Information specifying function
- Inter-vehicle communication function VEHICLE A
- Single path plan function
- Candidate path generation function
- Path combination search function
- Following control function
- Information specifying function
- Inter-vehicle communication function A1: Specify attribute info of vehicle A
A2: Plan a single path of vehicle A
A3: Generate candidate paths for vehicle A
A4: Search for path combination
A5: Perform following control along travel path of vehicle A. Transmit travel paths of vehicles B, C

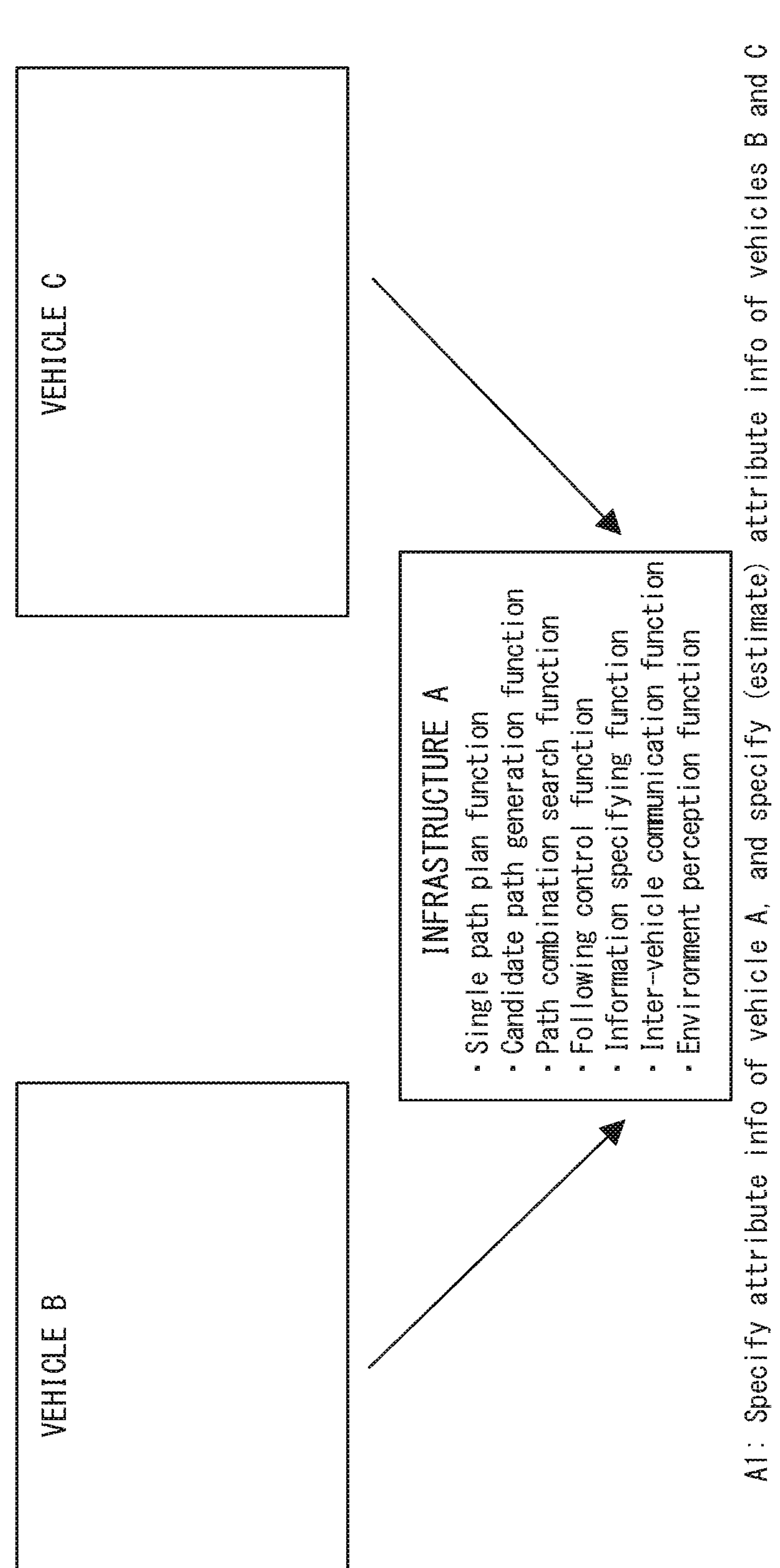
FIG. 25
VEHICLE C
VEHICLE B
INFRASTRUCTURE A
· Single path plan function
· Candidate path generation function
· Path combination search function
· Following control function
· Information specifying function
· Inter-vehicle communication function
· Environment perception function
A1: Specify attribute info of vehicle A, and specify (estimate) attribute info of vehicles B and C
A2: Plan a single path of vehicle A, and plan (predict) a single path for each vehicle B, C
A3: Generate candidate paths for each vehicle A, B, C
A4: Search for path combination
A5: Perform following control along travel path of vehicle A

FIG. 26

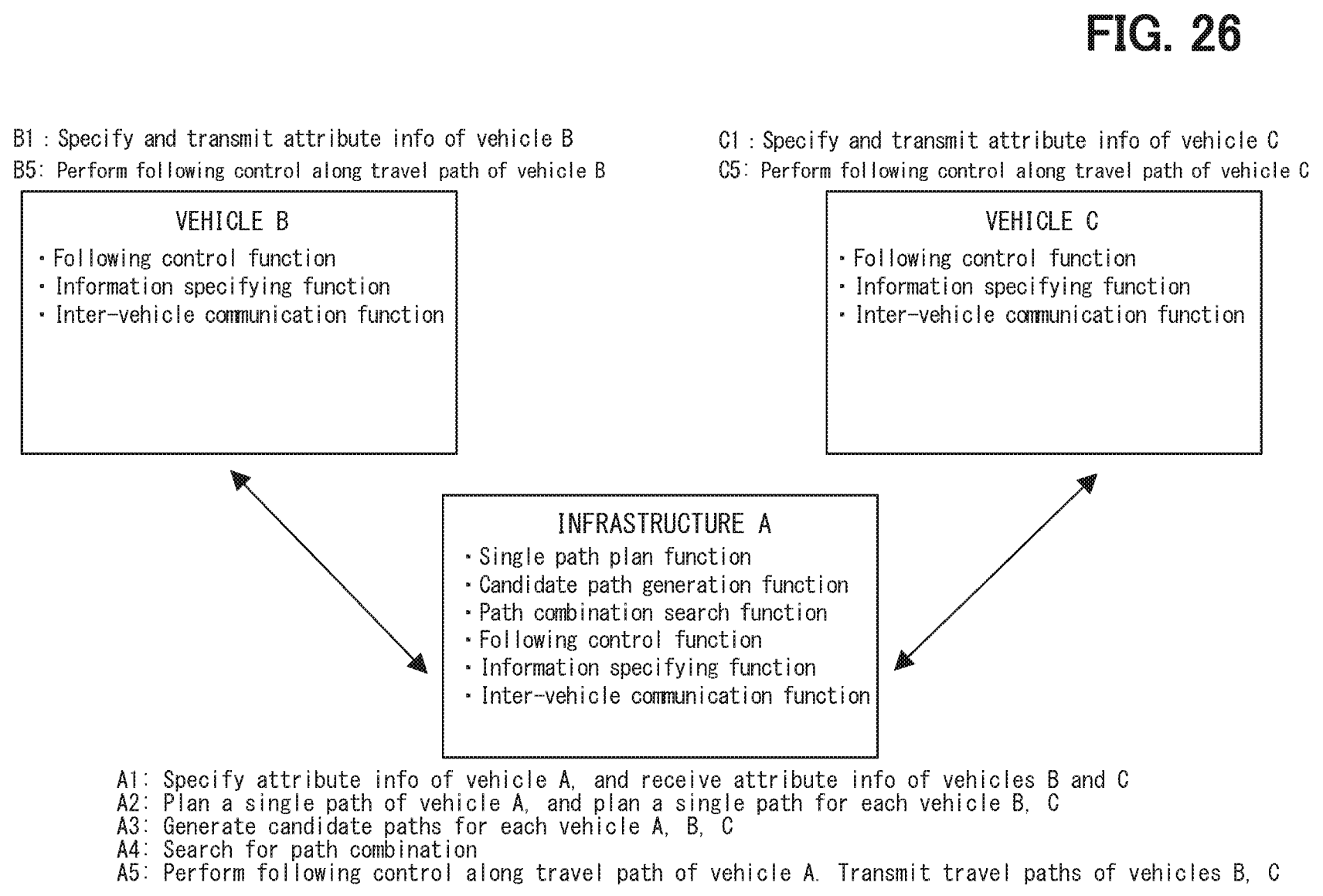

B1 : Specify and transmit attribute info of vehicle B
B5: Perform following control along travel path of vehicle B VEHICLE B
- Following control function
- Information specifying function
- Inter-vehicle communication function C1 : Specify and transmit attribute info of vehicle C
C5: Perform following control along travel path of vehicle C VEHICLE C
- Following control function
- Information specifying function
- Inter-vehicle communication function INFRASTRUCTURE A
- Single path plan function
- Candidate path generation function
- Path combination search function
- Following control function
- Information specifying function
- Inter-vehicle communication function A1: Specify attribute info of vehicle A, and receive attribute info of vehicles B and C
A2: Plan a single path of vehicle A, and plan a single path for each vehicle B, C
A3: Generate candidate paths for each vehicle A, B, C
A4: Search for path combination
A5: Perform following control along travel path of vehicle A. Transmit travel paths of vehicles B, C

Figure 35:
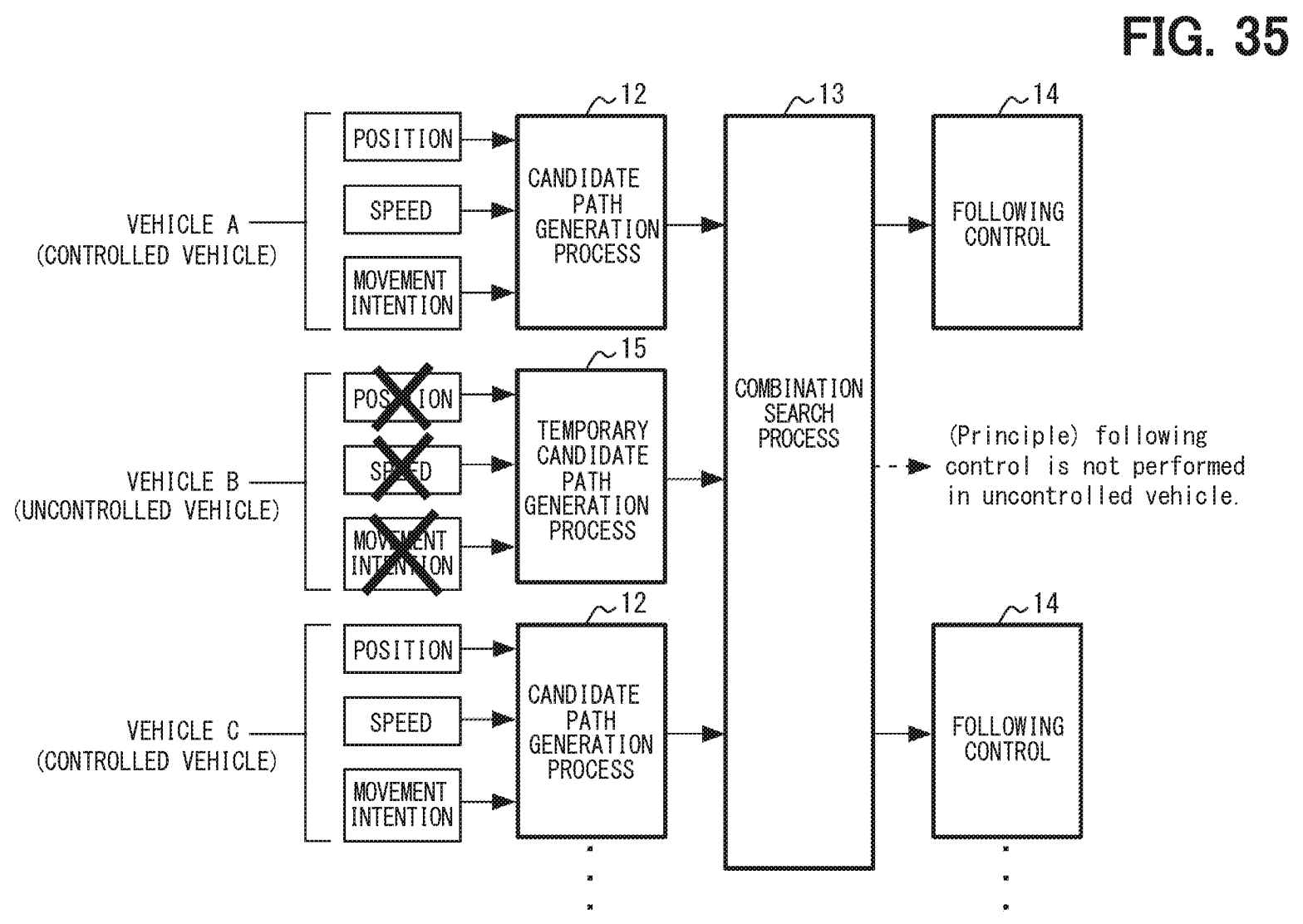

VEHICLE A (CONTROLLED VEHICLE)
POSITION
SPEED
MOVEMENT INTENTION
12 CANDIDATE PATH GENERATION PROCESS
VEHICLE B (UNCONTROLLED VEHICLE)
POSITION
SPEED
MOVEMENT INTENTION
15 TEMPORARY CANDIDATE PATH GENERATION PROCESS
VEHICLE C (CONTROLLED VEHICLE)
POSITION
SPEED
MOVEMENT INTENTION
12 CANDIDATE PATH GENERATION PROCESS
13 COMBINATION SEARCH PROCESS
14 FOLLOWING CONTROL
(Principle) following control is not performed in uncontrolled vehicle.
14 FOLLOWING CONTROL

FIG. 37

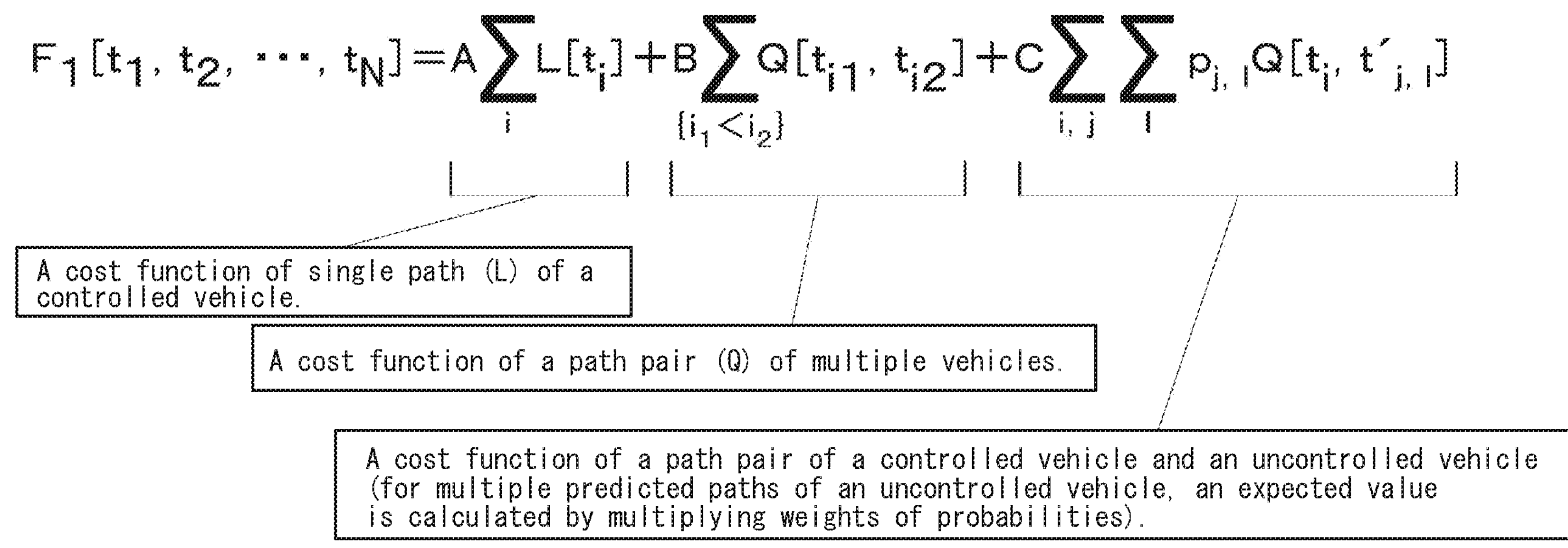

t: index of a path of controlled vehicle.

t' : index of a path of uncontrolled vehicle.

$t'_{j,l}$ indicates the l-th temporary path of the j-th uncontrolled vehicle.

p: probability indicating that the uncontrolled vehicle actually travels on a certain temporary candidate path.

$p_{j,l}$ is probability indicating that the uncontrolled vehicle actually travels on the l-th temporary path of the j-th uncontrolled vehicle.

A, B, C: arbitrary constant.

FIG. 38

A cost function (the expected value F2 of the cost function) in which the cost of the least preferable temporary candidate path among all of the temporary candidate paths is reflected is minimized.

$$F_2[t_1, t_2, \cdots, t_N] = A\sum_{i} L[t_i] + B\sum_{\{i_1 < i_2\}} Q[t_{i1}, t_{i2}] + C\sum_{i,j} \mathrm{Max}_l(Q[t_i, t'_{j,l}])$$

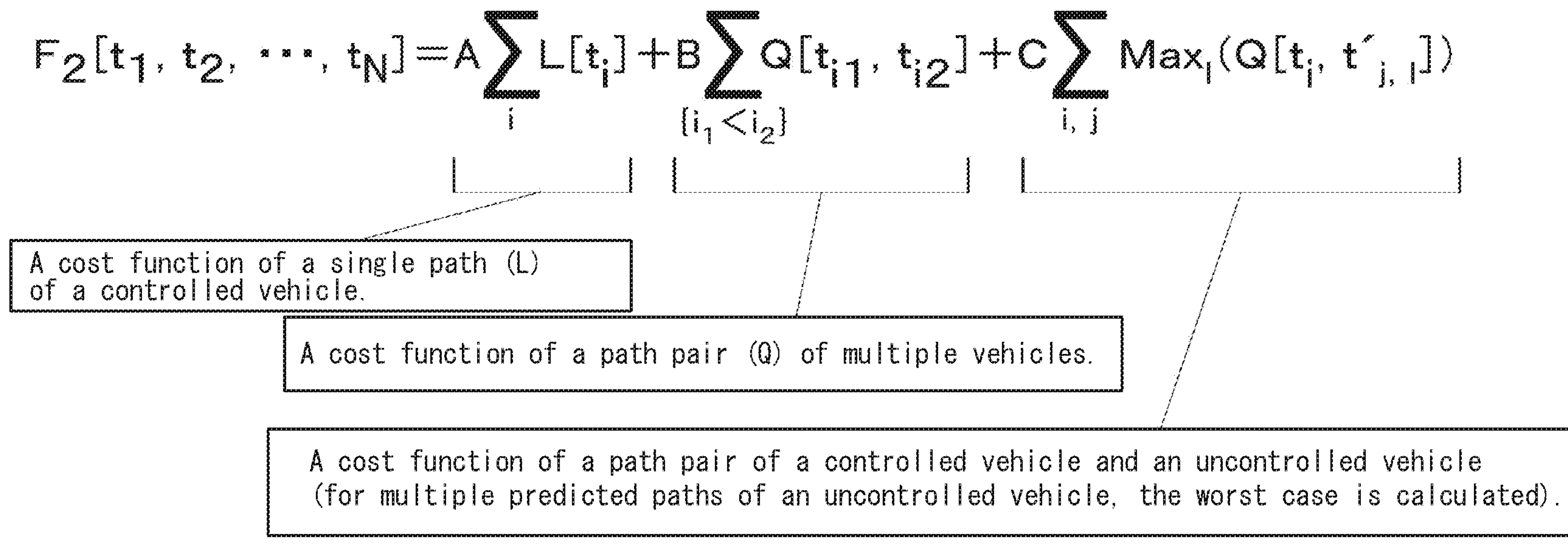

t: index of a path of controlled vehicle.

t' : index of a path of uncontrolled vehicle.

$t'_{j,l}$ indicates the l-th temporary path of the j-th uncontrolled vehicle.

A, B, C: arbitrary constant.

The least preferable case is a case where the calculation result of the cost by the Max function is maximized.

Execution timing (example):
・an environment of vehicle on which the vehicle travel path planning system is mounted or environment of predetermined vehicle discontinuously changes.
・when the changed state continues for a predetermined duration or longer, or the like.

FIG. 40

| | |
|---|---|
| (1) Constant speed straight traveling | $\begin{pmatrix} x(t) \\ y(t) \end{pmatrix} = \begin{pmatrix} x(0) + v_x t \\ y(0) \end{pmatrix}$ $\begin{pmatrix} \dot{x}(t) \\ \dot{y}(t) \end{pmatrix} = \begin{pmatrix} v_x \\ 0 \end{pmatrix}$ |
| (2) Accelerated/ Decelerated traveling | $\begin{pmatrix} x(t) \\ y(t) \end{pmatrix} = \begin{pmatrix} x(0) + v_x t + a_x t^2/2 \\ y(0) \end{pmatrix}$ $\begin{pmatrix} \dot{x}(t) \\ \dot{y}(t) \end{pmatrix} = \begin{pmatrix} v_x + a_x t \\ 0 \end{pmatrix}$ |
| (3) Lane change traveling | $\begin{pmatrix} x(t) \\ y(t) \end{pmatrix} = \begin{pmatrix} x(0) + v_x t \\ y(0) + v_y t \end{pmatrix}$ $\begin{pmatrix} \dot{x}(t) \\ \dot{y}(t) \end{pmatrix} = \begin{pmatrix} v_x \\ v_y \end{pmatrix}$ |

VEHICLE TRAVEL ROUTE PLANNING SYSTEM

CROSS REFERENCE TO RELATED APPLICATION

This application is based on Japanese Patent Applications No. 2022-152561 filed on Sep. 26, 2022 and Japanese Patent Applications No. 2023-079499 filed on May 12, 2023, the disclosures of which are incorporated herein by reference.

TECHNICAL FIELD

The present disclosure relates to a vehicle travel path planning system that plans travel paths for multiple vehicles.

BACKGROUND

For example, JP 2020-046384 A discloses a route estimation system that estimates optimal routes for multiple moving bodies by executing a program on an ising optimization computer provided by a quantum computer.

For example, JP 2017-182521 A discloses a vehicle travel control system that corrects a target route of a host vehicle based on a travel trajectory of another vehicle when the target route of the host vehicle based on map information is different from a travel environment around the host vehicle.

SUMMARY

A vehicle travel path planning system, which plans an optimal combination of travel paths for all of multiple vehicles included in a vehicle group, includes: a single path planning unit planning, as a single path, one travel path for each of the multiple vehicles; a candidate path generation unit generating multiple candidate paths similar to the single path planned for each of the multiple vehicles; and a combination search unit selecting an optimal travel path from the multiple candidate paths generated for each of the multiple vehicles and searching for an optimal travel path combination for all of the multiple vehicles included in the vehicle group.

BRIEF DESCRIPTION OF DRAWINGS

The above and other features and advantages of the present disclosure will become more apparent from the following detailed description made with reference to the accompanying drawings.

FIG. 7 is a diagram showing an example of cost function represented as an ising model according to an embodiment of the present disclosure.

FIG. 11 is a diagram (part 1) schematically showing a derivation example of cost function according to an embodiment of the present disclosure.

FIG. 12 is a diagram (part 2) schematically showing a derivation example of cost function according to an embodiment of the present disclosure.

FIG. 13 is a diagram (part 1) schematically showing a definition example of constraint condition according to an embodiment of the present disclosure.

FIG. 14 is a diagram (part 2) schematically showing a definition example of constraint condition according to an embodiment of the present disclosure.

FIG. 16 is a diagram schematically showing a simulation example of path combination search function according to an embodiment of the present disclosure.

FIG. 19 is a diagram schematically showing a second configuration example of a vehicle travel path planning system according to an embodiment of the present disclosure.

FIG. 23 is a diagram schematically showing a sixth configuration example of a vehicle travel path planning system according to an embodiment of the present disclosure.

FIG. 25 is a diagram schematically showing an eighth configuration example of a vehicle travel path planning system according to an embodiment of the present disclosure.

FIG. 26 is a diagram schematically showing a ninth configuration example of a vehicle travel path planning system according to an embodiment of the present disclosure.

FIG. 32 is a diagram schematically showing a fifteenth configuration example of a vehicle travel path planning system according to an embodiment of the present disclosure.

FIG. 33 is a diagram schematically showing a sixteenth configuration example of a vehicle travel path planning system according to an embodiment of the present disclosure.

FIG. 35 is a diagram schematically showing an example of combination search process according to a modified embodiment of the present disclosure.

FIG. 37 is a diagram (part 1) schematically showing a derivation example of cost function according to a modified embodiment of the present disclosure.

FIG. 38 is a diagram (part 2) schematically showing a derivation example of cost function according to a modified embodiment of the present disclosure.

FIG. 40 is a diagram schematically showing an example of constant speed straight traveling, acceleration/deceleration traveling, and lane change traveling according to a modified embodiment of the present disclosure.

DETAILED DESCRIPTION

For example, in a traffic scene where multiple vehicles travel close to each other, such as an intersection or a merging point of an expressway, it is required to ensure safety in the entire traffic scene or it is required to suppress the amount of carbon dioxide emission in the entire traffic scene. That is, it is required to plan a combination of optimal travel paths for the entire vehicles included in the vehicle group existing in the traffic scene.

A vehicle travel path planning system according to the present disclosure plans an optimal combination of travel paths for all of multiple vehicles included in a vehicle group. The vehicle travel path planning system includes: a single path planning unit planning, as a single path, one travel path for each of the multiple vehicles; a candidate path generation unit generating multiple candidate paths similar to the single path planned for each of the multiple vehicles; and a combination search unit selecting an optimal travel path from the multiple candidate paths generated for each of the multiple vehicles and searching for an optimal travel path combination for all of the multiple vehicles included in the vehicle group.

According to the vehicle travel path planning system according to the present disclosure, it is possible to plan optimal travel paths for entire vehicles included in a vehicle group as a whole.

The following will describe embodiments of a vehicle travel path planning system according to the present disclosure with reference to the drawings. Elements that are substantially the same in the embodiments are denoted by the same reference symbols, and description thereof will be omitted.

(Vehicle Travel Path Planning System)

Figure 1:
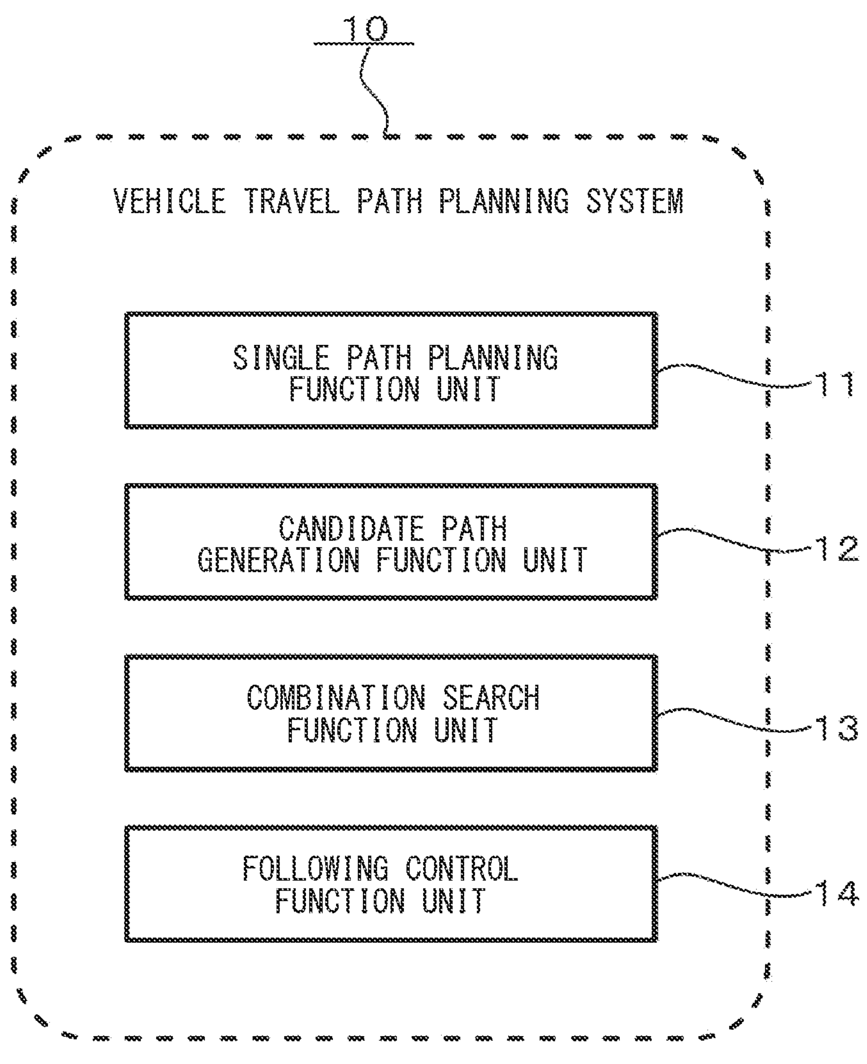
FIG. 1 is a diagram schematically showing a configuration example of a vehicle travel path planning system according to an embodiment of the present disclosure.

A vehicle travel path planning system 10 shown in FIG. 1 is a system for planning a combination of optimal travel paths for an entire vehicle group including multiple vehicles. The system includes a single path planning function unit 11, a candidate path generation function unit 12, a combination search function unit 13, and a following control function unit 14. The single path planning function unit 11, the candidate path generation function unit 12, the combination search function unit 13, and the following control function unit 14 may be virtually implemented in software manner by executing a predetermined program on an information processing device such as a computer. The single path planning function unit 11, the candidate path generation function unit 12, the combination search function unit 13, and the following control function unit 14 may be implemented in hardware manner, or may be implemented by a combination of software and hardware. Hereinafter, the vehicle travel path planning system 10 may be simply referred to as a system 10.

The single path planning function unit 11 is an example of a single path planning unit and is able to execute a single path planning process. The single path planning process is a process of planning one travel path as a single path for each of the multiple vehicles.

The candidate path generation function unit 12 is an example of a candidate path generation unit and is able to execute a candidate path generation process. The candidate path generation process is a process of generating multiple candidate paths, which is a candidate path group similar to a single path, for each of the multiple vehicles.

The combination search function unit 13 is an example of a combination search unit and is able to execute a combination search process. The combination search process is a process of selecting an optimal travel path from multiple candidate paths for each of multiple vehicles and searching for an optimal travel path combination for the entire vehicle group including the multiple vehicles. The combination search function unit 13 may be implemented by a quantum inspired computer based on a well-known quantum inspired technology. The combination search function unit 13, which is well-known combination optimization solver, is required to increase a speed of algorithm and search for an optimal combination of travel paths with high speed and high efficiency. The quantum inspired technology is a computing technology capable of processing complex calculations at high speed on a current computer (classical computer) by imitating the behavior of a quantum phenomenon based on a spirit obtained from a quantum computer. According to the quantum inspired technology, an optimization problem that a quantum computer is good at can be solved at high speed by the classical computer.

The following control function unit 14 is an example of a following control unit and is able to execute following control. The following control is a control process that is autonomously executed in each vehicle according to the optimal travel path searched by the combination search function unit 13. When a vehicle does not follow the optimal travel path searched by the combination search function unit 13, the following control function unit 14 may notify the vehicle of warning information. Alternatively, the following control function unit 14 may not notify the vehicle of warning information.

Figure 2:
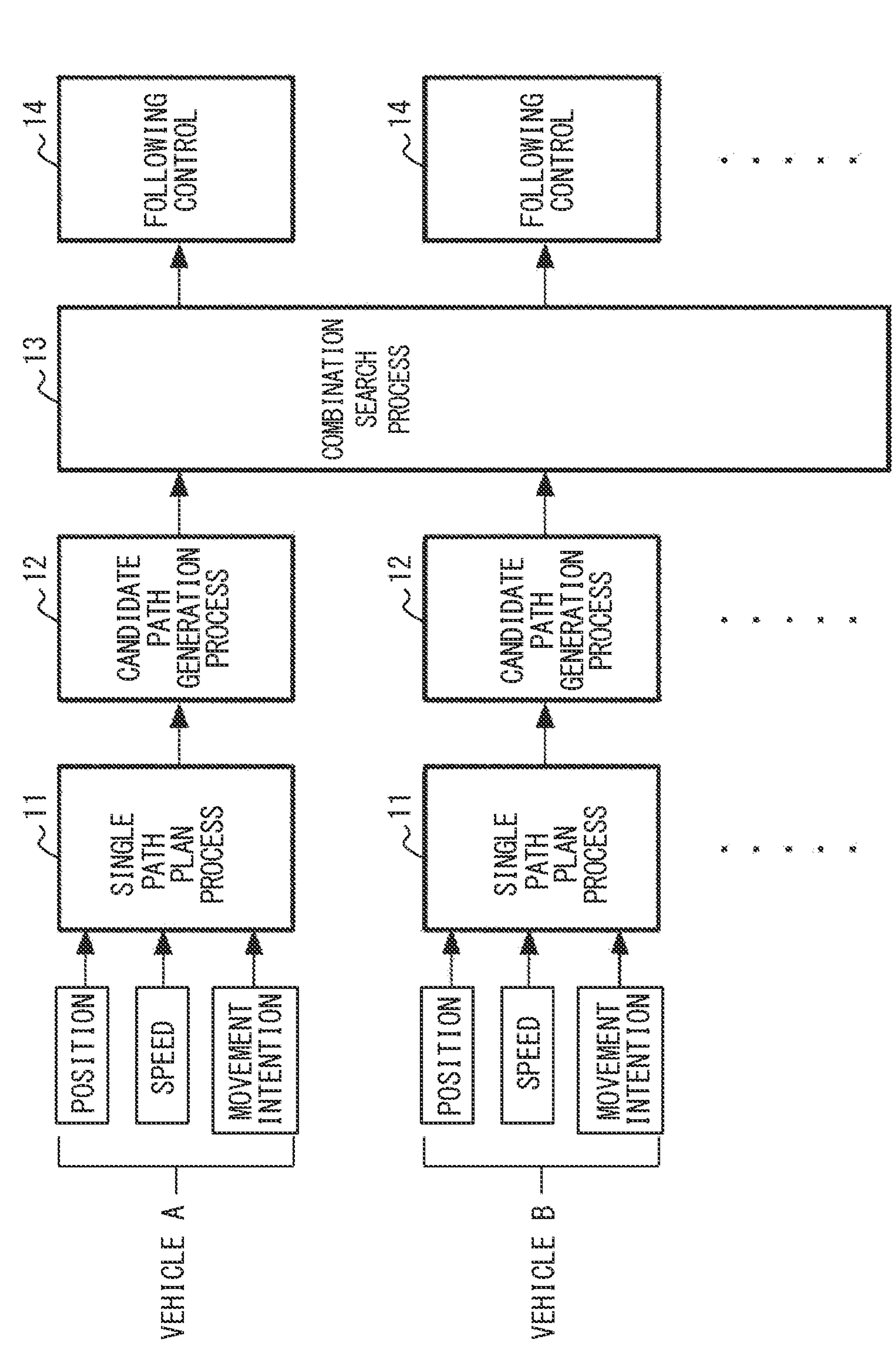
FIG. 2 is a diagram schematically showing an example of combination search process according to an embodiment of the present disclosure.

FIG. 2 schematically shows a combination search process executed by the system 10 to search for an optimal combination of travel paths.

Figure 3:
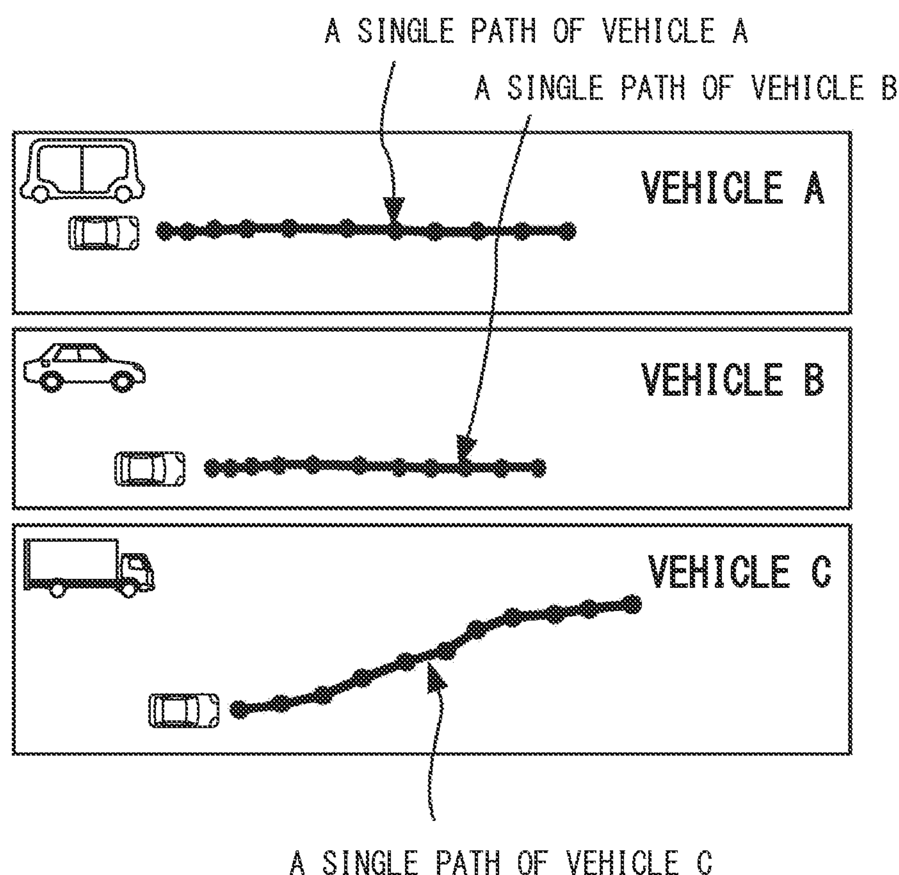
FIG. 3 is a diagram schematically showing an example of a single path planned by a single path planning process according to an embodiment of the present disclosure.

In the system 10, the single path planning function unit 11, by executing the single path planning process, plans the single path of each vehicle based on the position information and speed information of the vehicle, movement intention information of the vehicle, and the like. FIG. 3 illustrates an example of a single path of each vehicle A, B, C planned by the single path planning process.

Figure 4:
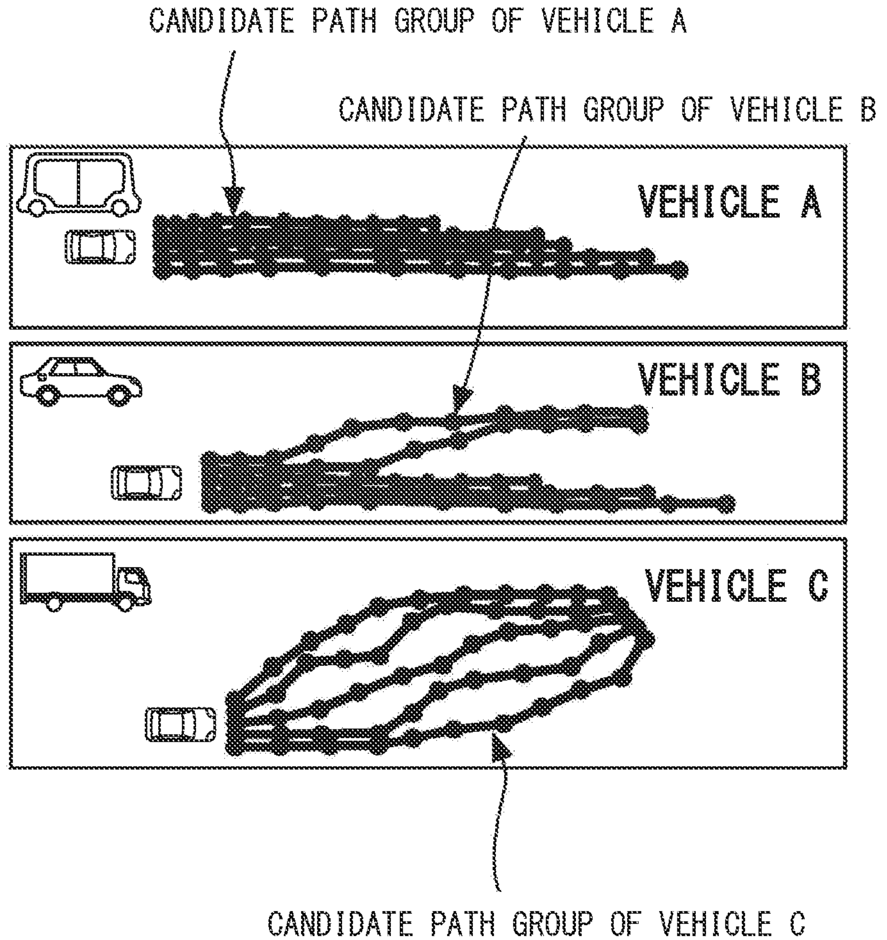
FIG. 4 is a diagram schematically showing an example of candidate path group generated by a candidate path generation process according to an embodiment of the present disclosure.

In the system 10, the candidate path generation function unit 12, by executing the candidate path generation process, generates, for each vehicle, multiple candidate paths similar to the single path, that is, generates a candidate path group. FIG. 4 illustrates an example of a candidate path group of each vehicle A, B, C generated by the candidate path generation process.

Figure 5:
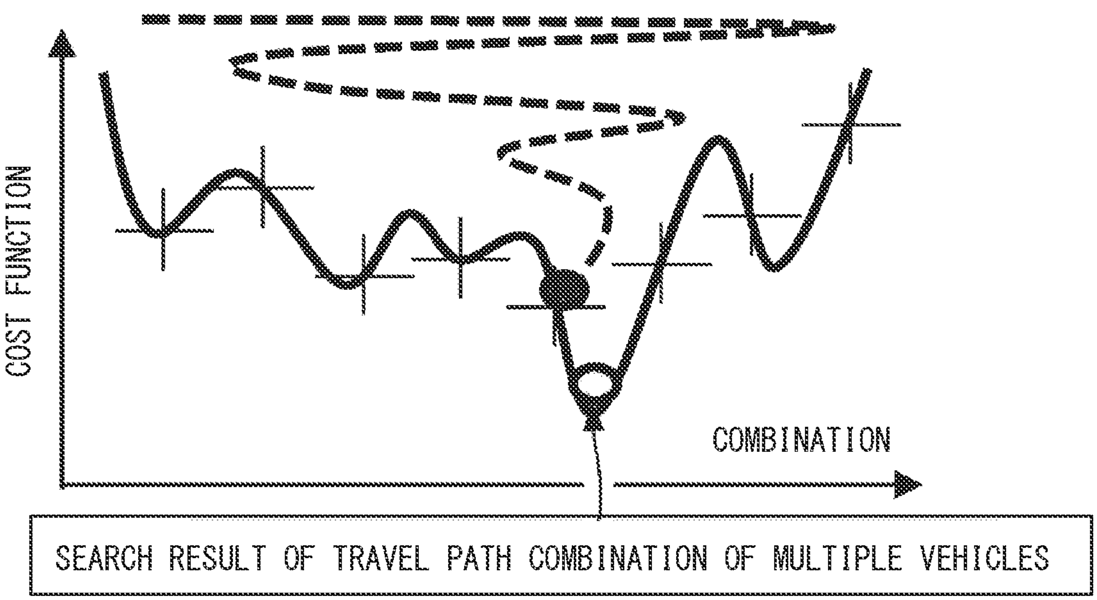
FIG. 5 is a diagram schematically showing a concept of combination search process according to an embodiment of the present disclosure.
Figure 6:
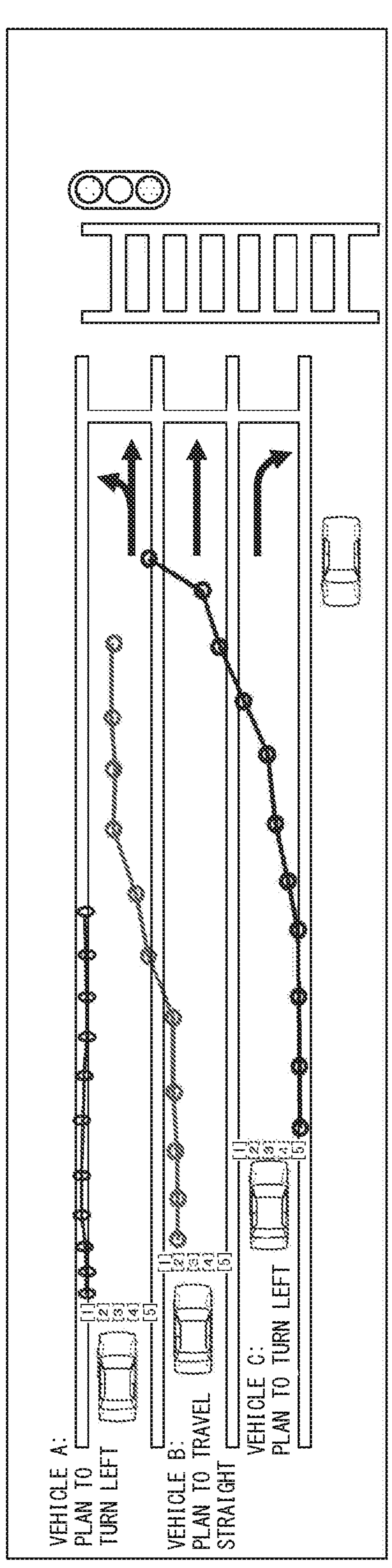
FIG. 6 is a diagram schematically showing an example of optimal combination search solution for a travel path according to an embodiment of the present disclosure.

In the system 10, the combination search function unit 13, by executing a combination search process, selects, for each vehicle, an optimal travel path from multiple candidate paths, that is, from the candidate path group. Then, the combination search function unit 13 searches for an optimal travel path combination of the entire vehicle group including multiple vehicles. FIG. 5 schematically illustrates a concept of the combination search process. In the combination search process, a combination that minimizes a cost function H(σ), which is to be described later, is obtained as an optimal combination search solution. For example, when a candidate path group as illustrated in FIG. 4 is generated for each vehicle A, B, C, a combination of paths for respective vehicles as illustrated in FIG. 6 is obtained as an optimal combination search solution by the combination search process. According to FIG. 6, the combination in which the vehicle A selects the travel path [1], the vehicle B selects the travel path [2], and the vehicle C selects the travel path [5] is the optimal combination search solution.

In the system 10, the following control function unit 14 in each vehicle executes a following control. Accordingly, each vehicle autonomously performs travel control to follow the selected optimal travel path.

When planning the single path in the search process, the position information of vehicle can be obtained by, for example, a positioning device mounted on the vehicle. The positioning device may construct a positioning system such as a global navigation satellite system (GNSS) or a global positioning system (GPS). The speed information of vehicle can be obtained by, for example, a speed sensor mounted on the vehicle. The movement intention information of vehicle can be obtained based on, for example, a manipulation state of a direction indicator mounted on the vehicle, a manipulation state of a steering wheel, an operation state of a vehicle navigation system, or the like.

In the search process, for searching for the optimal travel path combination, a combination, which makes a predetermined cost function H(σ) to have a minimum value, is specified as an optimal combination. FIG. 7 illustrates a cost function H(σ) with which a well-known ising model is expressed. The cost function H(σ) is set based on a Hamiltonian function which is usually used in the ising model.

$$H(\sigma) = -\sum_{i<j} j_{ij}\sigma_i\sigma_j - \sum_{i=1}^{N} h_i\sigma_i \quad \text{(Formula 1)}$$

(1) Definition of σi, σj (Formulation)

σi, σj indicates a path for each vehicle. A position, a speed, and the like at each time are determined from it.

(2) Definition of $j_{ij}$ (Formulation).

$j_{ij}$ indicates a constraint and a cost index for a combination of planned paths of respective vehicles at the same time (compatibility of combination of individual planned paths).

(3) Definition of hi (Formulation)

hi indicates constraint and cost index for the single planned path of each vehicle (desirability of a single planned path).

In the present disclosure, the definitions of the main symbols are as follows.

m: index of vehicle, minimum value=1, maximum value=$m_{max}$.

n: index of individual path of a certain vehicle, minimum value=1, maximum value=$n_{max}$.

j: index of path (pseudo qubit), minimum value=1, maximum value=$m_{max}$*$n_{max}$.

xi(k), yi(k): position of the i-th path selection (n-th path of the m-th vehicle) at time k.

$\dot{x}$i(k), $\dot{y}$i(k): speed of the i-th path selection (n-th path of the m-th vehicle) at time k.

Mi: weight of the i-th path at time k.

Vi(k): speed of the i-th path at time k.

Figure 8:
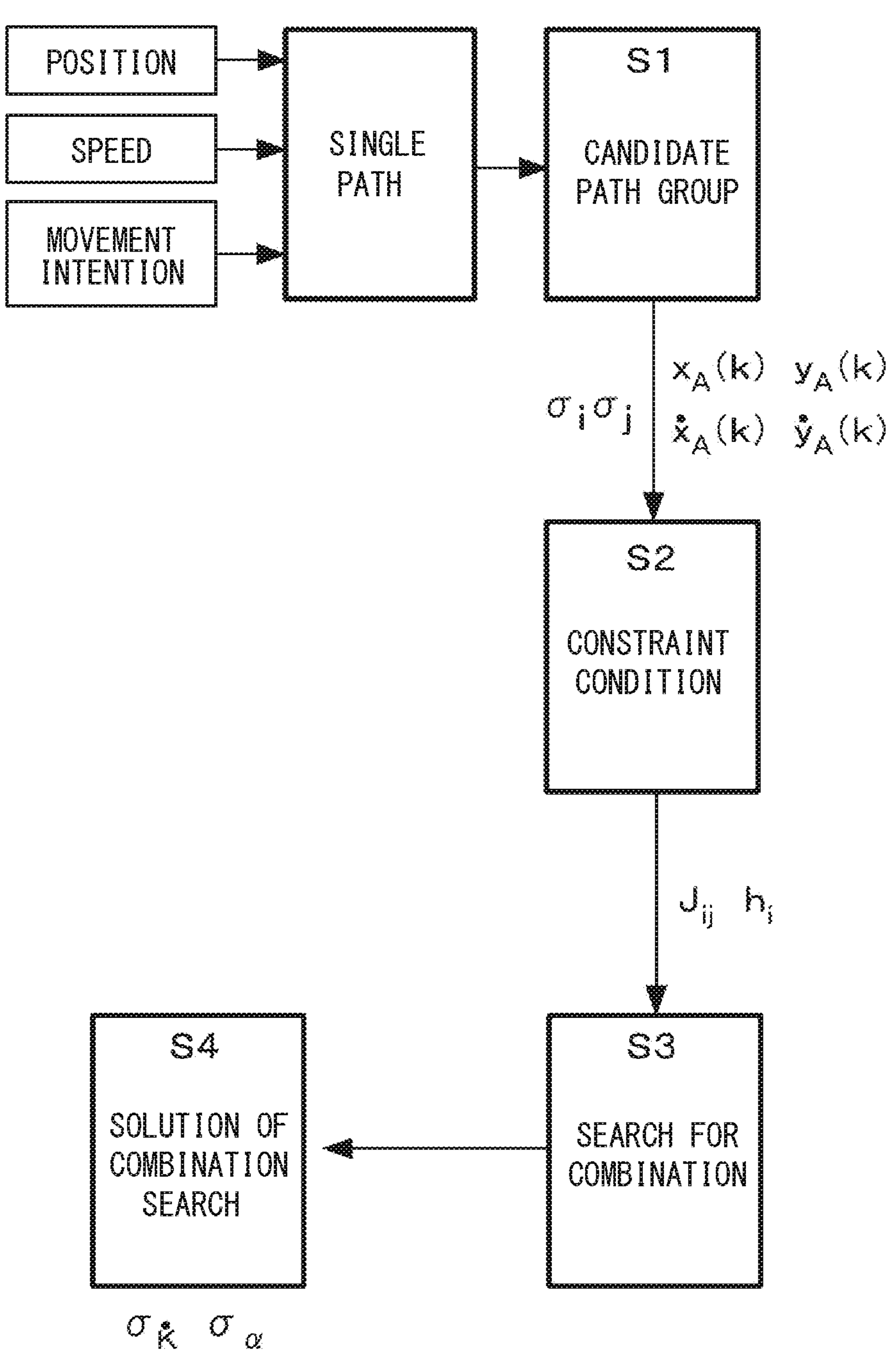
FIG. 8 is a diagram schematically showing a process of obtaining combination search solution of an optimal travel path based on a cost function according to an embodiment of the present disclosure.

FIG. 8 schematically illustrates a process of obtaining the optimal combination search solution of travel paths based on the cost function H(σ). The candidate path group (step S1), which is generated based on the position information of the vehicle, the speed information of the vehicle, and the movement intention information of the vehicle, corresponding to the single path, is processed by the combination search process (step S3) using the cost function H(σ) in the quantum inspired computer under the set constraint condition (step S2). Then, the combination, which makes the cost function H(σ) to be minimized, is obtained as the solution of optimal combination search (step S4).

Figure 9:
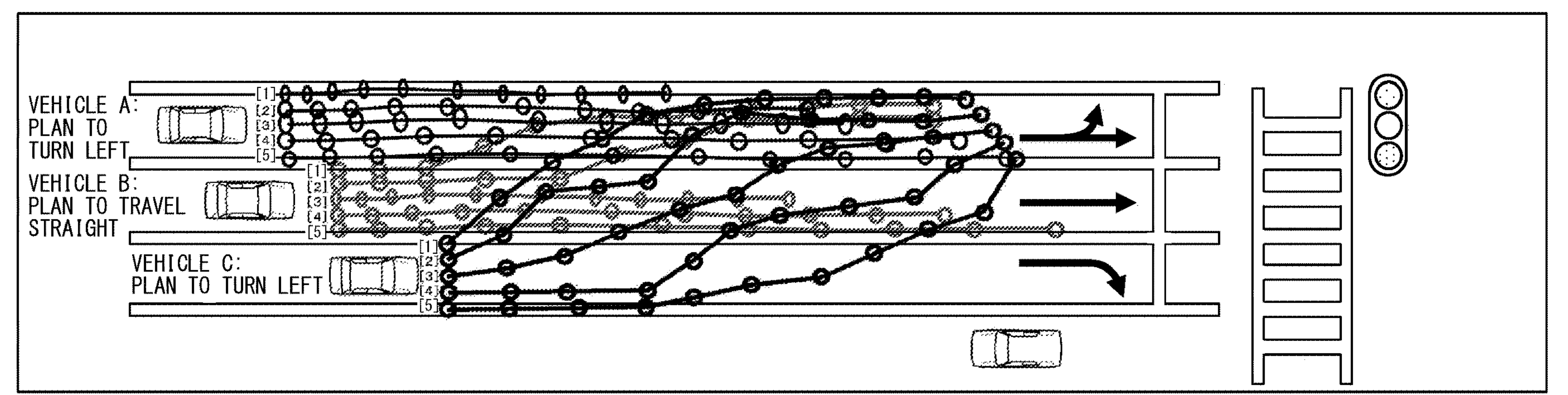
FIG. 9 is a diagram (part 1) for describing a process of generating a candidate path group according to an embodiment of the present disclosure.

In the generation of the candidate path group (step S1), for example, as illustrated in FIG. 9, multiple travel paths [1], [2], [3], [4], and [5] are assigned to each vehicle A, B, C.

In FIG. 9, the selection of each path [1], [2], [3], [4], [5] by each vehicle A, B, C is defined as σi.

$x_{ij}$: the j-th path candidate of i-th vehicle.

σi: allocate elements of $x_{ij}$ in order.

$x_{i*}$: for $x_{i*}$, a constraint is applied such that only one element is set to have value of 1, and remaining elements are set to 0 (a constraint that one vehicle must necessarily select one path).

Figure 10:
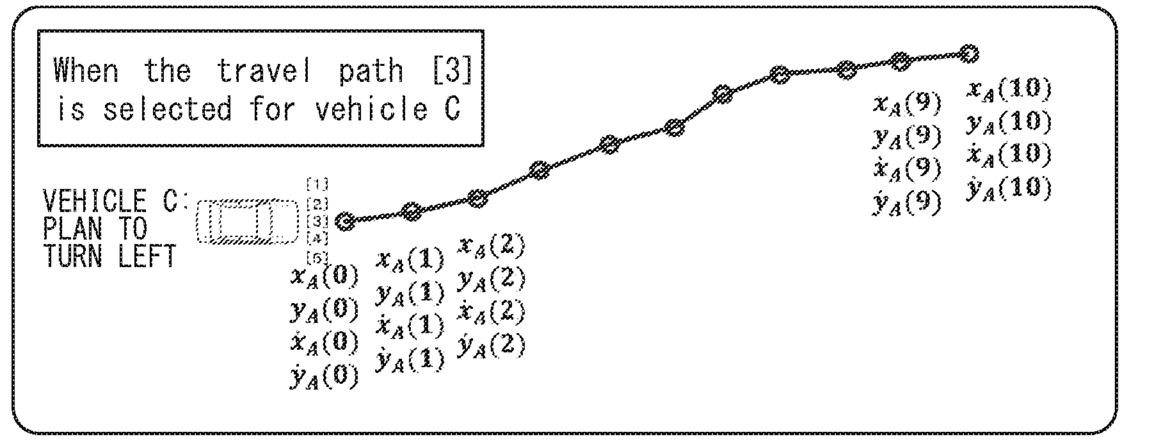
FIG. 10 is a diagram (part 2) for describing a process of generating a candidate path group according to an embodiment of the present disclosure.

Then, as illustrated in FIG. 10, position information and speed information at time k are specified for each travel path. FIG. 10 illustrates an example of the position information and the speed information specified when the travel path [3] is selected for the vehicle C. The position information and the speed information at time k are generalized as xA (k), yA (k), $\dot{x}$A(k), $\dot{y}$A(k), where k indicates an index assigned to time.

FIG. 11 illustrates an example of derivation of the cost function H(σ). That is, the known function group illustrated in FIG. 12 is extended to multiple vehicles, a cost function of a single path and a cost function of a path pair is defined as illustrated in FIG. 11 in consideration of an energy loss associated with traveling of the vehicle as necessary, then the cost function H(σ) is derived from an expression defined as described above. The path pair is a pair of a path selected in one vehicle and a path selected in another vehicle.

It is defined that the number of vehicles is N, the state of i-th vehicle at time k is $x_i$(k)=((Xi (k), Yi (k), Vi (k), θi (k), Ki (k)), and an operation of i-th vehicle is $u_i$ (k)=($u_{a,i}$(k), $u_{K,i}$ (k)).

The multiple vehicle path planning problem can be defined as follows.

$$Mnimize\sum_{i=1}^{N} L(x_i, u_i) + \sum_{i=1}^{N}\sum_{j=i+1}^{N} Q((x_i, u_i), (x_j, u_j)) \quad \text{(Formula 2)}$$

The ($x_i$, $u_i$) follows the equation of motion of the vehicle. L ($x_i$, $u_i$) is the cost function of a single path, and Q (($x_i$, $u_i$), ($x_j$, $u_j$)) is the cost function of path pair. These are respectively defined by the following formula 3 and formula 4.

$$L(x_i, u_i) = \sum_k E_i(k) + L_{lat,i}(k) + L_{vel,i}(k) + L_{cur,i}(k) + L_{yaw,i}(k) + L_{acc,i}(k) + L_{\kappa,i}(k) \quad \text{(Formula 3)}$$

$$Q((x_i, u_i), (x_j, u_j)) = \sum_k \tau(L_i(k) - L_j(k)) \cdot (w_{ttc} \cdot L_{ttc,i,j}(k) + w_{thw} \cdot L_{thw,i,j}(k)) \quad \text{(Formula 4)}$$

Formula 5 is obtained from formula 2.

$$H(\sigma) = -\sum_{i<j} j_{ij}\sigma_i\sigma_j - \sum_{i=1}^{N} h_i\sigma_i \quad \text{(Formula 5)}$$

Formula 5 is solved by a quantum inspired machine.

The known function group illustrated in FIG. 12 is as follows.

$L_{lat}$(k): a value evaluating whether the vehicle is traveling correctly in a middle area of the road.

$L_{dist}$(k): a value evaluating whether the vehicle maintains a constant distance from another vehicle.

$L_{vel}$(k): a value evaluating whether the speed of vehicle is equal to a recommended speed.

$L_{cur}$(k): a value evaluating whether a curvature of the vehicle is equal to a recommended curvature.

$L_{yaw}$(k): a value evaluating whether a yaw angle of the vehicle is equal to a recommended yaw angle.

$L_{acc}$(k): a value evaluating a penalty for an acceleration operation of the vehicle.

$L_K$(k): a value evaluating a penalty for a steering wheel operation of the vehicle.

By extending the disclosure in the related art G. T. M. Obayashi, "Real-Time Autonomous Car Motion Planning using NMPC with Approximated Problem Considering Traffic Environment", International Federation of Automotive Control, 2018 to multiple vehicles, the following formula 6 is obtained.

$$L_{dist,total}(k) = \sum_{i=1}^{N}\sum_{j=i+1}^{N} \tau(L_i(k) - L_j(k)) \cdot (w_{ttc} \cdot L_{ttc,i,j}(k) + w_{thw} \cdot L_{thw,i,j}(k)) \quad \text{(Formula 6)}$$

When the energy loss is added to formula 6, the following formula 7 is obtained.

$$E_i(k) = \sum_k \eta_k \cdot \left|\frac{1}{2}M_iV_i(k+1)^2 - \frac{1}{2}M_iV_i(k)^2\right| \quad \text{(Formula 7)}$$

Next, constraint conditions of the combination search function unit 13, which functions as a known optimization solver, will be described. The solver is a function implemented by a computer that obtains an optimal solution for a predetermined scene based on a predetermined formula, algorithm, constraint condition, or the like.

FIG. 13 illustrates an example in which a constraint condition is defined as "one vehicle must select one travel path". In the formula 8 illustrated in FIG. 13, the cost function H(σ) is assigned with a constraint condition that "one vehicle must select one travel path". By being assigned with such a constraint condition, the combination search function unit 13 allocates one travel path to each vehicle and searches for an optimal combination of travel paths for respective vehicles included in the entire vehicle group.

$$H(\sigma_i) = \sum_{m=1}^{m_{max}}\left(\sum_{n=1}^{n_{max}} x_{mn} - 1\right)^2 \quad \text{(Formula 8)}$$

In formula 8, $x_{mn}$ is assigned with $x_{mn}$=1 when the m-th vehicle selects the n-th path, and is assigned with $x_{mn}$=0 when the m-th vehicle does not select the n-th path.

For example, in a case where three vehicles each has five path candidates, σ=[$x_1$, $x_{12}$, $x_{13}$, $x_{14}$, $x_{15}$, $x_{21}$, $x_{22}$, $x_{23}$, $x_{24}$, $x_{25}$, $x_{31}$, $x_{32}$, $x_{33}$, $x_{34}$, $x_{35}$]$^T$. Here, $x_{ik}$ is assigned with 1 when the i-th vehicle selects the k-th path, and is assigned with 0 when the i-th vehicle does not select the k-th path.

For example, when the vehicles A, B, and C shown in FIG. 13 are, respectively, represented by m=1, m=2, and m=3, the paths [1], [2], [3], [4], and [5] of the vehicle C are represented as (m=3, n=1), (m=3, n=2), (m=3, n=3), (m=3, n=4), and (m=3, n=5).

FIG. 14 illustrates an example in which a constraint condition is defined for obtaining a combination of safe and secure travel paths for avoiding collision of multiple vehicles in consideration of the time to collision. In the formula 9 shown in FIG. 14, the cost function H(σ) is assigned with a constraint condition that a combination of safe and secure travel paths for avoiding collision of multiple vehicles. By being assigned with such a constraint condition, the combination search function unit 13 searches for an optimal combination of travel paths for avoiding collision of multiple vehicles.

Cost function: time to collision, as large as possible.

(Formula 9)

$$TTC(k)_{AB} = \frac{\text{Distance between vehicles } A \text{ and } B}{\text{Relative speed between vehicles } A \text{ and } B} = \frac{\left\{\left(\overrightarrow{P_B} - \overrightarrow{P_A}\right)\cdot\left(\overrightarrow{P_B} - \overrightarrow{P_A}\right)\right\}^{1/2}}{\left\{\left(\overrightarrow{P_B} - \overrightarrow{P_A}\right)\cdot\left(\overrightarrow{V_A} - \overrightarrow{V_B}\right)\right\}^{1/2}}$$

Maximization: $\min TTC = \min(TTC(k)_{ij})$

The inter-vehicle distance of the numerator and the relative speed of the denominator in formula 9 are obtained by the following formulas 10 and 11, respectively.

$$\left\{\left(\overrightarrow{P_B} - \overrightarrow{P_A}\right)\cdot\left(\overrightarrow{P_B} - \overrightarrow{P_A}\right)\right\}^{1/2} = \left\{(x_A - x_B)^2 + (y_A - y_B)^2\right\}^{1/2} \quad \text{(Formula 10)}$$

$$\left\{\left(\overrightarrow{P_B} - \overrightarrow{P_A}\right)\cdot\left(\overrightarrow{V_A} - \overrightarrow{V_B}\right)\right\}^{1/2} = \{(x_A - x_B)(\dot{x}_A - \dot{x}_B) + (y_A - y_B)(\dot{y}_A - \dot{y}_B)\}^{1/2} \quad \text{(Formula 11)}$$

Figure 15:
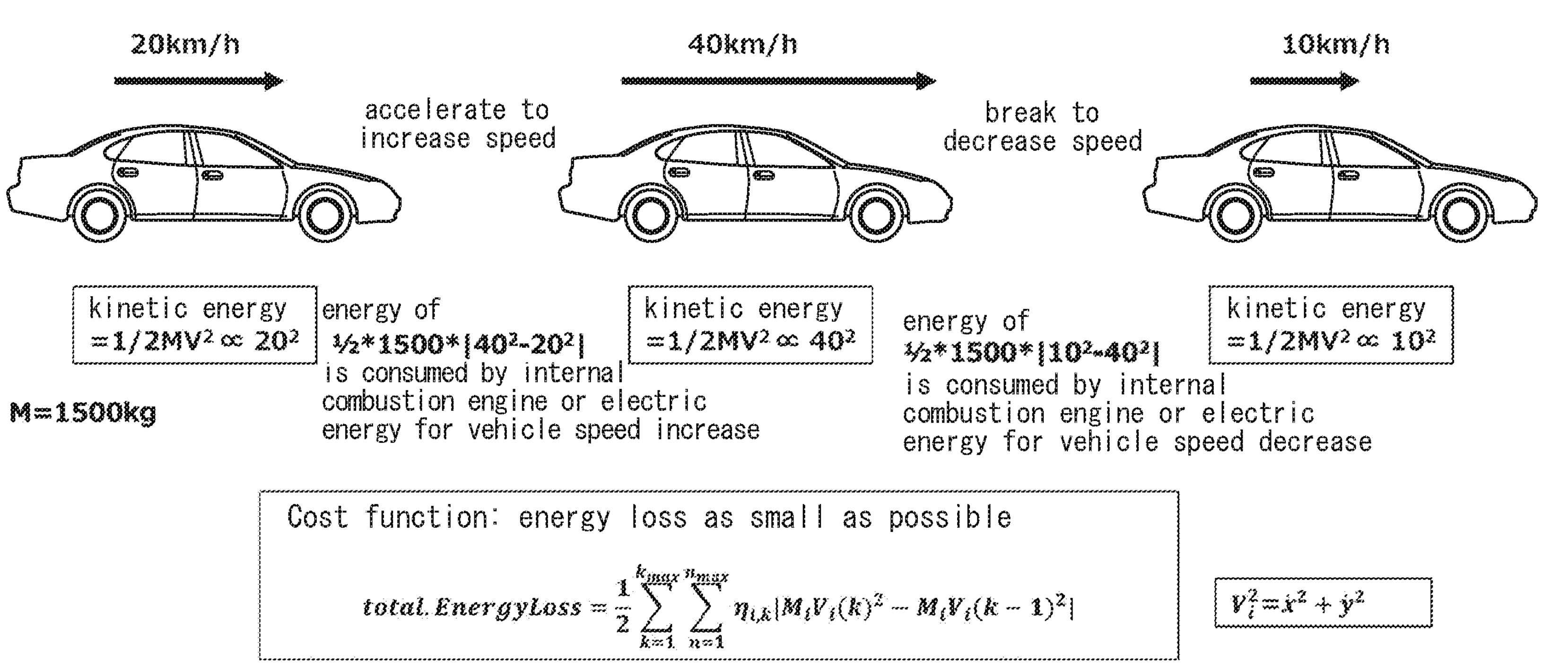
FIG. 15 is a diagram (part 3) schematically showing a definition example of constraint condition according to an embodiment of the present disclosure.

FIG. 15 illustrates an example in which a constraint condition is defined for obtaining a combination of travel paths for saving fuel consumption of entire vehicles included in the vehicle group. In the formula illustrated in FIG. 15, a constraint condition of obtaining a combination of travel paths that suppress the fuel consumption of the entire vehicle group including multiple vehicles is assigned to the cost function H(σ). By being assigned with such a constraint condition, the combination search function unit 13 searches for an optimal combination of travel paths for suppressing fuel consumption of the multiple vehicles configuring the entire vehicle group.

The cost function for reducing the energy loss shown in FIG. 15 is represented by the following formula 12.

$$\text{total. } EnergyLoss = \frac{1}{2}\sum_{k=1}^{k_{max}}\sum_{n=1}^{n_{max}} \eta_{i,k}\left|M_i V_i(k)^2 - M_i V_i(k-1)^2\right| \quad \text{(Formula 12)}$$

Here, vie is obtained by the following formula 13.

$$V_i^2 = \dot{x}^2 + \dot{y}^2 \quad \text{(Formula 13)}$$

In formula 12, in the case of electric vehicle, partial energy is recovered by energy regeneration, and the effect of energy recovery is expressed by η.

Next, an example of simulation executed by the path combination search function of the system 10 will be described in detail with reference to FIG. 16. The traffic scene assumed in this simulation is as follows.

There is a road with three traffic lanes in each direction, and there is an intersection 300 meters ahead from the current location.

A vehicle P is stopped 150 meters ahead of the current location in lane 1.

Initially, the vehicle A is traveling in the lane 1, the vehicle B is traveling in the lane 2, and the vehicle C is traveling in the lane 3 in parallel with one another in a direction perpendicular to the traveling direction.

Initially, the vehicle A intends to travel in lane 1, the vehicle B intends to travel in lane 2, and the vehicle C intends to travel in lane 3.

The lane 1 is a left-turn only lane, the lane 2 is a straight-ahead only lane, and the lane 3 is a right-turn only lane.

Under such an assumption, when the simulation is executed by the path combination search function of the present disclosure, in the situation 1, the vehicle A decelerates and the vehicles B and C move ahead.

Next, in the situation 2, the vehicle A changes travel lane to the lane 2 to avoid the stopped vehicle P.

Next, in the situation 3, the vehicle B changes travel lane to the lane 1 after passing the stopped vehicle P.

Next, in the situation 4, after the vehicle B changes travel lane to the lane 1, the vehicle A changes travel lane to return to the lane 1.

Next, in the situation 5, the vehicle C changes travel lane to the lane 2 after completion of the lane change of the vehicle A to the lane 1.

As described above, according to the path combination search function of the present disclosure, it has been demonstrated that it is possible to simultaneously determine and search for an optimal combination of travel paths for the entire vehicle group including multiple vehicles A, B, and C using the quantum inspired machine, and it is possible to implement a safe cooperative operation of the vehicle group.

Figure 17:
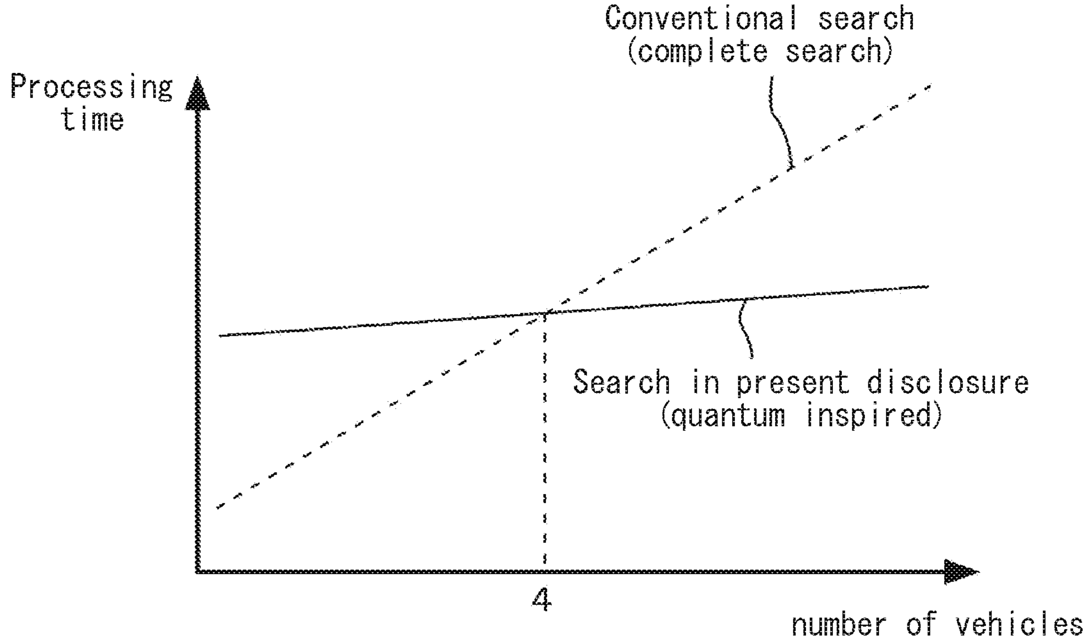
FIG. 17 is a diagram schematically showing a comparative example showing processing time required for a search according to an embodiment of the present disclosure.

As illustrated in FIG. 17, the inventors of the present disclosure have confirmed that when the number of vehicles included in the vehicle group exceeds four, the processing duration required for the path combination search by the quantum inspired machine becomes shorter than the processing duration required for the complete search according to the conventional processing. That is, the path combination search process of the present disclosure is significantly effective when the number of vehicles included in the vehicle group exceeds four. In the conventional processing of complete search, all combinations of candidate paths are searched for the respective vehicles. According to the conventional complete search, for example, when there are nine vehicles are included in the vehicle group and each vehicle has ten candidate paths, the number of path combinations is about one billion, and complete search processing of all of the path combinations requires enormous processing duration.

The inventors of the present disclosure compared the conventional processing of complete search and the processing by ising machine according to the present disclosure, and confirmed the high-speed solving performance of the ising machine according to the present disclosure. More specifically, in a case where the number of vehicles included in the vehicle group is five or more, the search processing according to the present disclosure is significantly superior to the conventional processing of complete search. In a case where the number of vehicles included in the vehicle group is six, the speed of search processing according to the present disclosure is ten thousand times or more of the speed of conventional processing of complete search, thereby providing high speed processing. The ising machine refers to a computer specialized in approximately solving a combination optimization problem.

The path combination search function of the system 10 described above can be arranged in vehicles and traffic infrastructure facilities constituting a traffic scene in a concentrated or distributed manner. The following will describe multiple system configuration examples related to the system 10 in detail. Hereinafter, the traffic infrastructure facility may be simply referred to as infrastructure. The vehicles A, B, and C illustrated in each configuration example may be manual driving vehicles being driven by a driver, or may be autonomous driving vehicles each equipped with an advanced driving support function, such as an advanced driver assistant system (ADAS).

Figure 18:
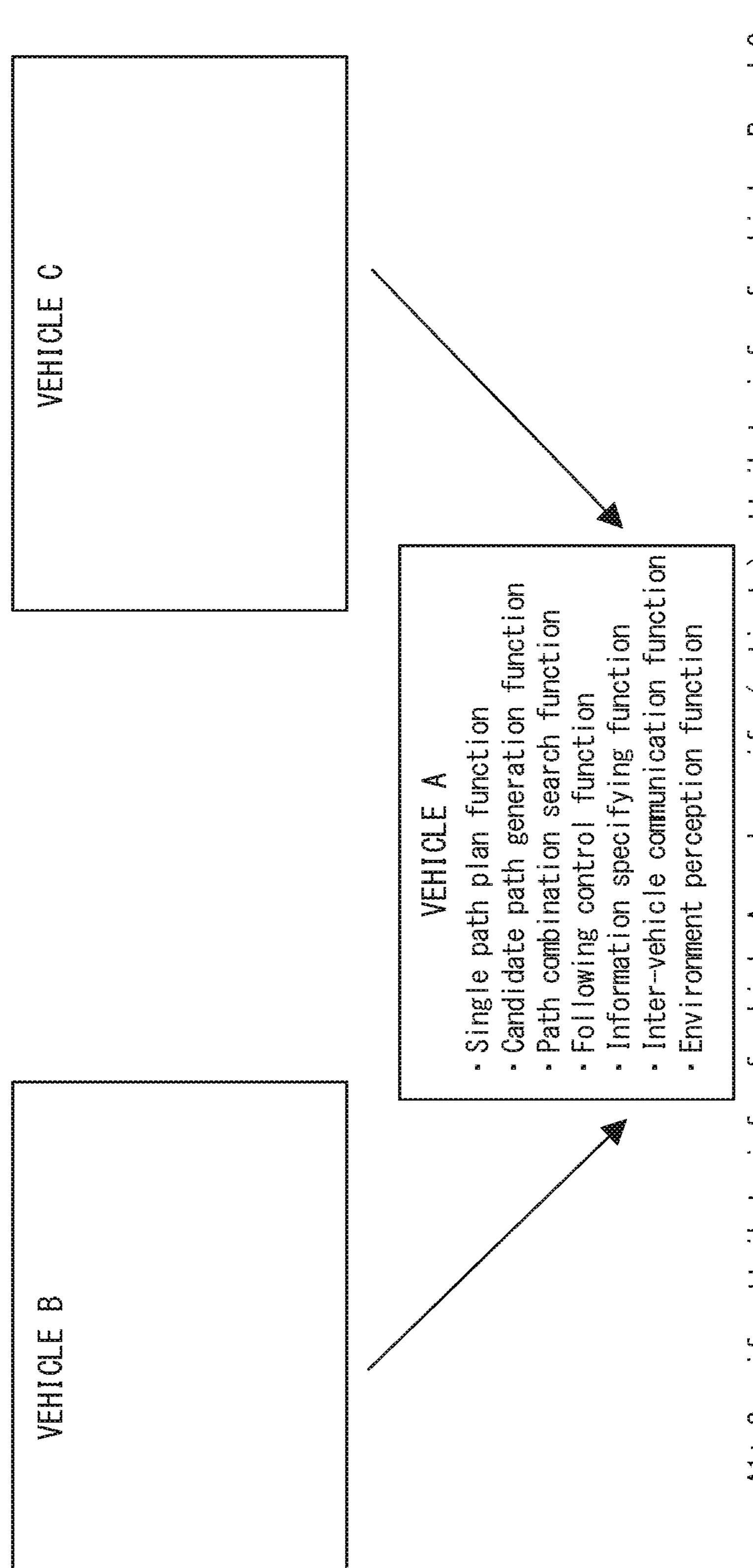
FIG. 18 is a diagram schematically showing a first configuration example of a vehicle travel path planning system according to an embodiment of the present disclosure.

According to the system configuration example illustrated in FIG. 18, the vehicle A is equipped with the single path planning function, the candidate path generation function, the path combination search function, and the following control function of the system 10. The vehicle A is equipped with an information specifying function for specifying vehicle attribute information, such as the position, speed, and movement intention of own vehicle. The vehicle A is equipped with an inter-vehicle communication function that enables inter-vehicle communication with another vehicle. The vehicle A is equipped with a environment perception function. The environment perception function is, for example, provided by a vehicle-mounted camera that captures an image of environment of own vehicle, a vehicle-mounted radar device that scans the environment of own vehicle, or the like. The vehicle B and the vehicle C each is not equipped with the single path planning function, the candidate path generation function, the path combination search function, and the following control function of the system 10, and is also not equipped with the information specifying function, the inter-vehicle communication function, and the environment perception function.

In the above system configuration example, in step (A1), the vehicle A specifies vehicle attribute information such as the position, speed, movement intention, or the like of own vehicle A. The vehicle A also specifies vehicle attribute information such as positions, speeds, and movement intentions of the vehicles B and C, which correspond to other vehicles, by analyzing a situation acquired by the environment perception function. The specifying of vehicle attribute information of the vehicles B and C by the vehicle A is merely prediction or estimation based on the analysis result acquired by the environment perception function.

Next, in step (A2), the vehicle A plans a single path of own vehicle A, based on the specified vehicle attribute information of the vehicle A. The vehicle A also plans a single path for each of the vehicles B and C, which correspond to other vehicles, based on the analysis result acquired by the environment perception function. The planning of single path, by the vehicle A, for each of the vehicles B and C is merely prediction or estimation based on the analysis result acquired by the environment perception function.

Next, in step (A3), the vehicle A generates multiple candidate paths, that is, a candidate path group similar to the single path of each of the vehicles A, B, and C planned by own vehicle.

Next, in step (A4), the vehicle A uses the path combination search function to search for an optimal combination of travel paths from the generated candidate path groups of the respective vehicles A, B, and C.

Next, in step (A5), the vehicle A executes the following control such that the vehicle A travels along the own travel path included in the searched combination of travel paths.

In the system configuration example illustrated in FIG. 18, instead of the vehicles B and C, for example, a moving object such as a pedestrian who moves according to a human person's intention or a bicycle which moves according to a human person's intention may correspond to a target.

According to the system configuration example illustrated in FIG. 19, the vehicle A is equipped with the single path planning function, the candidate path generation function, the path combination search function, and the following control function of the system 10. The vehicle A is also equipped with an information specifying function and an inter-vehicle communication function. The vehicle B and the vehicle C each is not equipped with the single path planning function, the candidate path generation function, the path combination search function of the system 10, but is equipped with the following control function, information specifying function, and the inter-vehicle communication function In the above system configuration example, in step (A1), the vehicle A specifies vehicle attribute information of own vehicle A. In step (B1), the vehicle B specifies vehicle attribute information of own vehicle B, and transmits the specified result to the vehicle A. In step (C1), the vehicle C specifies vehicle attribute information of own vehicle C, and transmits the specified result to the vehicle A. The vehicle A receives, from the vehicles B and C, the vehicle attribute information of each of the vehicles B and C, which correspond to other vehicles.

Next, in step (A2), the vehicle A plans a single path of own vehicle A, based on the specified vehicle attribute information of the vehicle A. The vehicle A also plans a single path for each of the vehicles B and C, which correspond to other vehicles, based on the received information.

Next, in step (A3), the vehicle A generates multiple candidate paths, that is, candidate path group similar to the planned single path of own vehicle A, generates multiple candidate paths, that is, candidate path group similar to the planned single path of vehicle B, and generates multiple candidate paths, that is, candidate path group similar to the planned single path of vehicle C.

Next, in step (A4), the vehicle A uses the path combination search function to search for an optimal combination of travel paths from the generated candidate path groups of the respective vehicles A, B, and C.

Next, in step (A5), the vehicle A executes the following control such that the vehicle A travels along the own travel path included in the searched combination of travel paths. The vehicle A transmits, to the vehicle B, the travel path searched for the vehicle B among the searched travel paths. The vehicle A transmits, to the vehicle C, the travel path searched for the vehicle C among the searched travel paths. In step (B5), the vehicle B executes the following control such that the vehicle B travels along the received travel path searched for the vehicle B. In step (C5), the vehicle C executes the following control such that the vehicle C travels along the received travel path related for the vehicle C.

Figure 20:
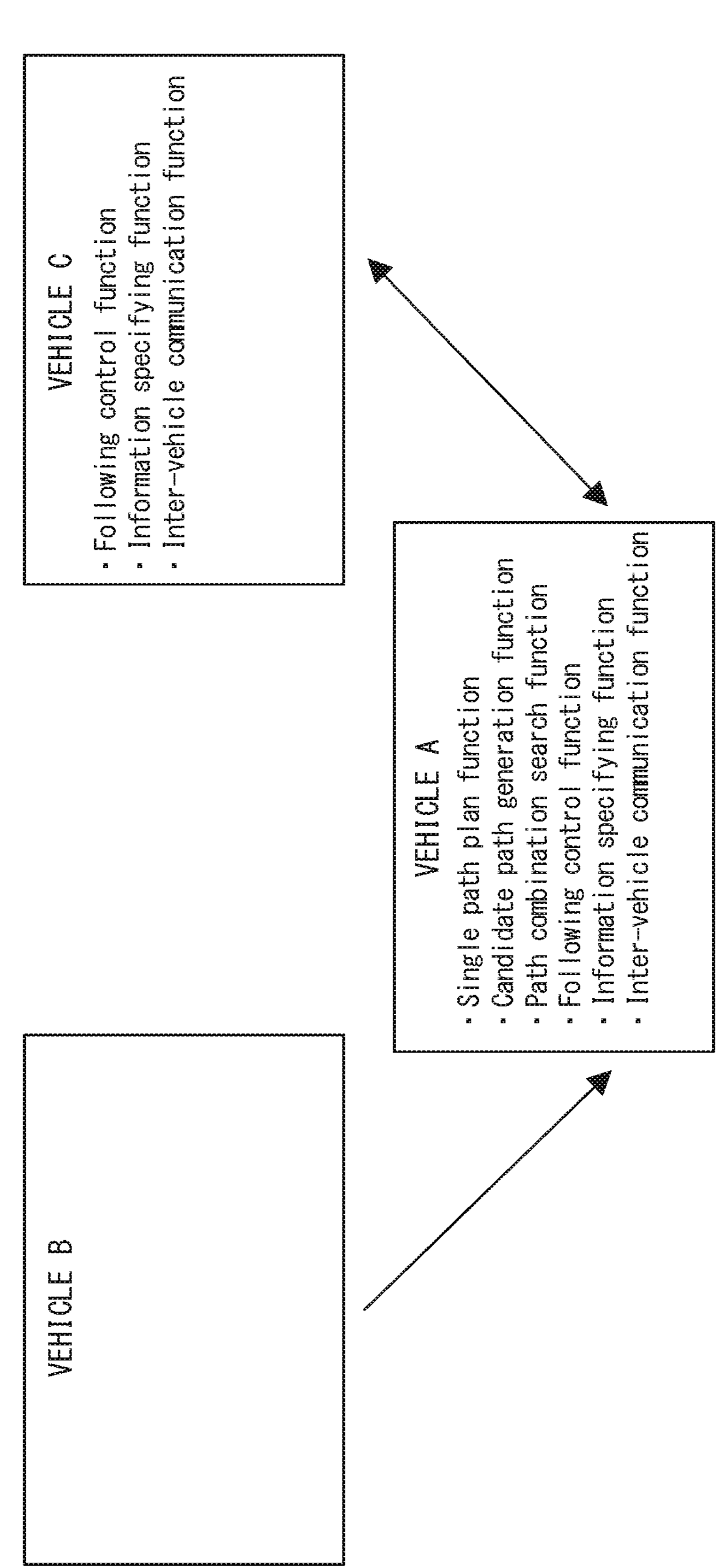
FIG. 20 is a diagram schematically showing a third configuration example of a vehicle travel path planning system according to an embodiment of the present disclosure.

According to the system configuration example illustrated in FIG. 20, the vehicle A is equipped with the single path planning function, the candidate path generation function, the path combination search function, and the following control function of the system 10. The vehicle A is also equipped with an information specifying function and an inter-vehicle communication function. The vehicle B is not equipped with the single path planning function, the candidate path generation function, the path combination search function, and the following control function of the system 10, and is also not equipped with the information specifying function and the inter-vehicle communication function. The vehicle C is not equipped with the single path planning function, the candidate path generation function, the path combination search function of the system 10, but is equipped with the following control function, information specifying function, and the inter-vehicle communication function That is, the system configuration example illustrated in FIG. 20 is a configuration example in which the system configuration example illustrated in FIG. 18 is combined with the system configuration example illustrated in FIG. 19.

Figure 21:
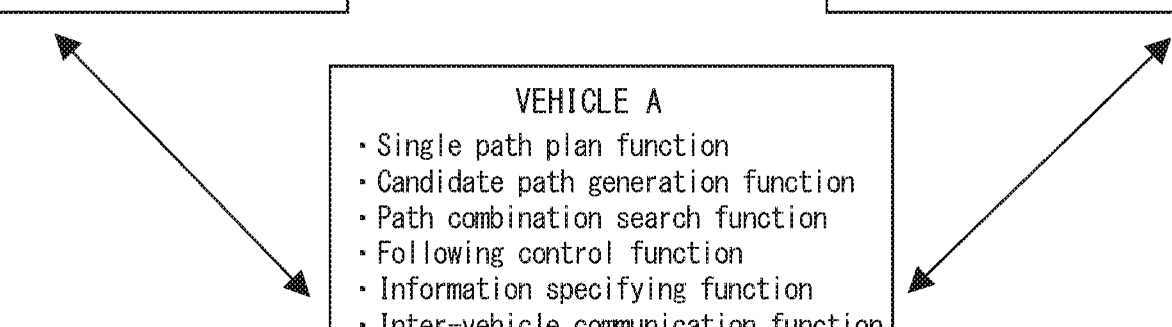
FIG. 21 is a diagram schematically showing a fourth configuration example of a vehicle travel path planning system according to an embodiment of the present disclosure.

According to the system configuration example illustrated in FIG. 21, the vehicle A is equipped with the single path planning function, the candidate path generation function, the path combination search function, and the following control function of the system 10. The vehicle A is also equipped with an information specifying function and an inter-vehicle communication function. The vehicle B and the vehicle C each is not equipped with the candidate path generation function and the path combination search function of the system 10, but is equipped with the single path planning function, the following control function, the information specifying function, and the inter-vehicle communication function.

In the above system configuration example, in step (A1), the vehicle A specifies vehicle attribute information of own vehicle A. In step (B1), the vehicle B specifies vehicle attribute information of own vehicle B. In step (C1), the vehicle C specifies vehicle attribute information of own vehicle C.

Next, in step (A2), the vehicle A plans a single path of own vehicle A, based on the specified vehicle attribute information of the vehicle A. In step (B2), the vehicle B plans a single path of own vehicle B, and transmits the planning result, that is, the planned single path to the vehicle A. In step (C2), the vehicle C plans a single path of own vehicle C, and transmits the planning result, that is, the planned single path to the vehicle A.

Next, in step (A3), the vehicle A generates multiple candidate paths, that is, candidate path group similar to the planned single path of own vehicle A, generates multiple candidate paths, that is, candidate path group similar to the received single path of vehicle B, and generates multiple candidate paths, that is, candidate path group similar to the received single path of vehicle C.

Next, in step (A4), the vehicle A uses the path combination search function to search for an optimal combination of travel paths from the generated candidate path groups of the respective vehicles A, B, and C.

Next, in step (A5), the vehicle A executes the following control such that the vehicle A travels along the own travel path included in the searched combination of travel paths. The vehicle A transmits, to the vehicle B, the travel path searched for the vehicle B among the searched travel paths. The vehicle A transmits, to the vehicle C, the travel path searched for the vehicle C among the searched travel paths. In step (B5), the vehicle B executes the following control such that the vehicle B travels along the received travel path searched for the vehicle B. In step (C5), the vehicle C executes the following control such that the vehicle C travels along the received travel path related for the vehicle C.

Figure 22:
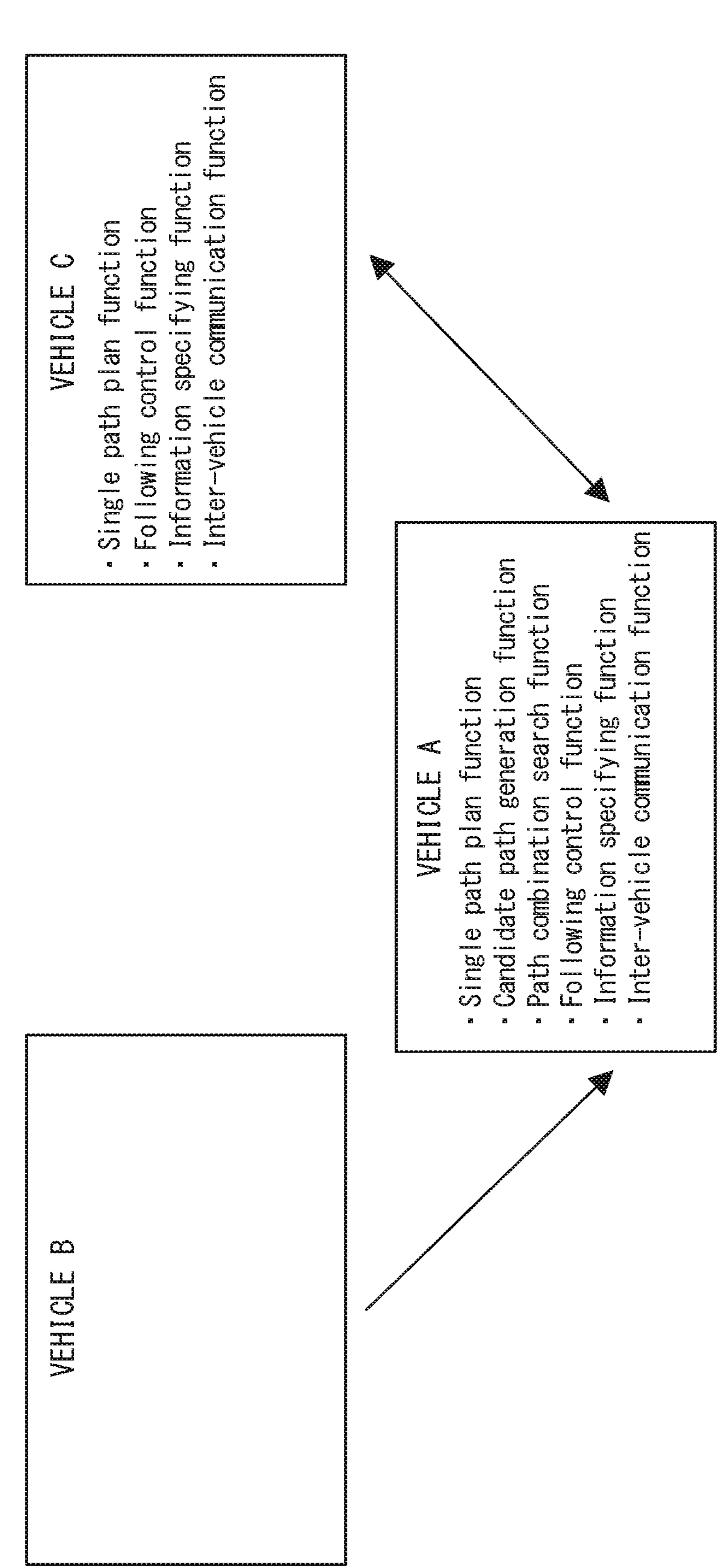
FIG. 22 is a diagram schematically showing a fifth configuration example of a vehicle travel path planning system according to an embodiment of the present disclosure.

According to the system configuration example illustrated in FIG. 22, the vehicle A is equipped with the single path planning function, the candidate path generation function, the path combination search function, and the following control function of the system 10. The vehicle A is also equipped with an information specifying function and an inter-vehicle communication function. The vehicle B is not equipped with the single path planning function, the candidate path generation function, the path combination search function, and the following control function of the system 10, and is also not equipped with the information specifying function and the inter-vehicle communication function. The vehicle C is not equipped with the candidate path generation function and the path combination search function of the system 10, but is equipped with the single path planning function, the following control function, the information specifying function, and the inter-vehicle communication function. That is, the system configuration example illustrated in FIG. 22 is a configuration example in which the system configuration example illustrated in FIG. 18 is combined with the system configuration example illustrated in FIG. 21.

According to the system configuration example illustrated in FIG. 23, the vehicle A is equipped with the single path planning function, the candidate path generation function, the path combination search function, and the following control function of the system 10. The vehicle A is also equipped with an information specifying function and an inter-vehicle communication function. The vehicle B and the vehicle C each is not equipped with the path combination search function of the system 10, but is equipped with the single path planning function, the candidate path generation function, the following control function, the information specifying function, and the inter-vehicle communication function.

In the above system configuration example, in step (A1), the vehicle A specifies vehicle attribute information of own vehicle A. In step (B1), the vehicle B specifies vehicle attribute information of own vehicle B. In step (C1), the vehicle C specifies vehicle attribute information of own vehicle C.

Next, in step (A2), the vehicle A plans a single path of own vehicle A, based on the specified vehicle attribute information of the vehicle A. In step (B2), the vehicle B plans a single path of own vehicle B. In step (C2), the vehicle C plans a single path of own vehicle C.

Next, in step (A3), the vehicle A generates multiple candidate paths similar to the single path of vehicle A, that is, generates a candidate path group. In step (B3), the vehicle B generates multiple candidate paths similar to the single path of vehicle B, that is, generates a candidate path group, and transmits the generated result, that is, the generated candidate path group to the vehicle A. In step (C3), the vehicle C generates multiple candidate paths similar to the single path of vehicle C, that is, generates a candidate path group, and transmits the generated result, that is, the generated candidate path group to the vehicle A.

Next, in step (A4), the vehicle A uses the path combination search function to search for an optimal combination of travel paths for the candidate path group of own vehicle A generated by own vehicle and the candidate path groups of respective vehicles B and C received from other vehicles B and C.

Next, in step (A5), the vehicle A executes the following control such that the vehicle A travels along the own travel path included in the searched combination of travel paths. The vehicle A transmits, to the vehicle B, the travel path searched for the vehicle B among the searched travel paths. The vehicle A transmits, to the vehicle C, the travel path searched for the vehicle C among the searched travel paths. In step (B5), the vehicle B executes the following control such that the vehicle B travels along the received travel path searched for the vehicle B. In step (C5), the vehicle C executes the following control such that the vehicle C travels along the received travel path related for the vehicle C.

Figure 24:
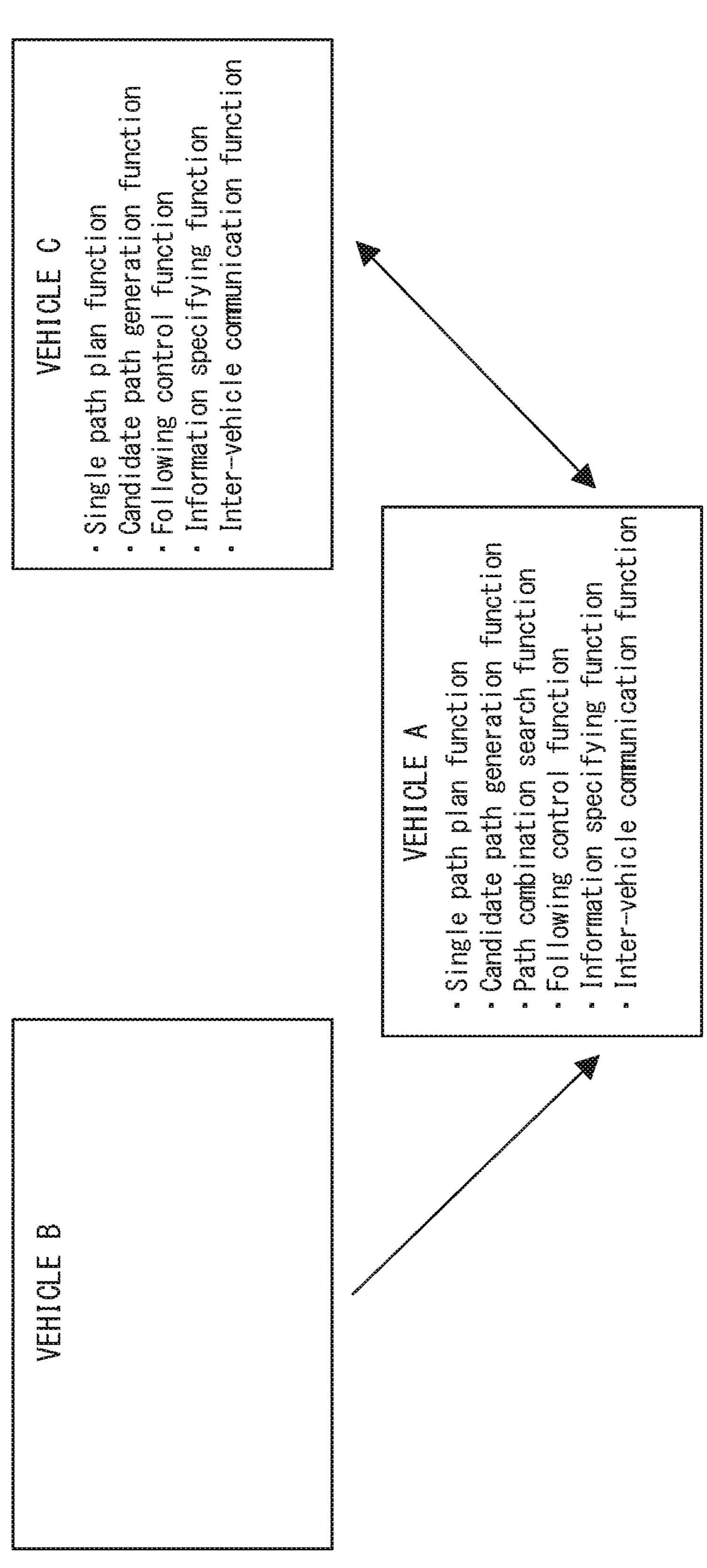
FIG. 24 is a diagram schematically showing a seventh configuration example of a vehicle travel path planning system according to an embodiment of the present disclosure.

According to the system configuration example illustrated in FIG. 24, the vehicle A is equipped with the single path planning function, the candidate path generation function, the path combination search function, and the following control function of the system 10. The vehicle A is also equipped with an information specifying function and an inter-vehicle communication function. The vehicle B is not equipped with the single path planning function, the candidate path generation function, the path combination search function, and the following control function of the system 10, and is also not equipped with the information specifying function and the inter-vehicle communication function. The vehicle C is not equipped with the path combination search function of the system 10, but is equipped with the single path planning function, the candidate path generation function, the following control function, the information specifying function, and the inter-vehicle communication function. That is, the system configuration example illustrated in FIG. 24 is a configuration example in which the system configuration example illustrated in FIG. 18 is combined with the system configuration example illustrated in FIG. 23.

Figure 27:
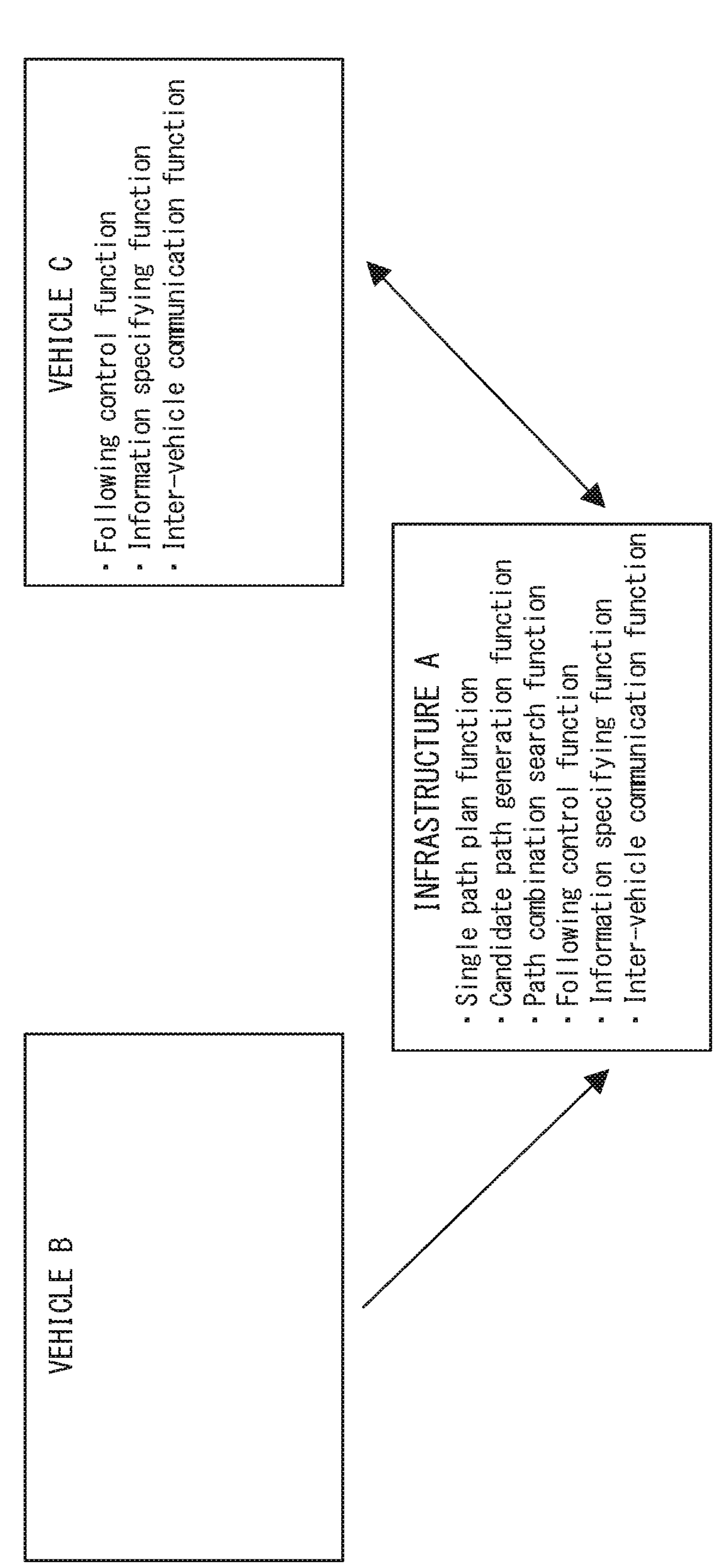
FIG. 27 is a diagram schematically showing a tenth configuration example of a vehicle travel path planning system according to an embodiment of the present disclosure.
Figure 28:
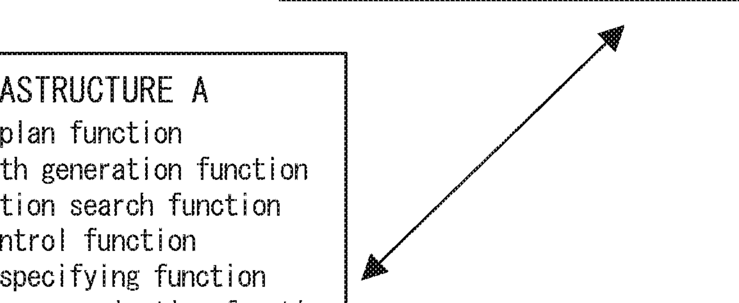
FIG. 28 is a diagram schematically showing an eleventh configuration example of a vehicle travel path planning system according to an embodiment of the present disclosure.
Figure 29:
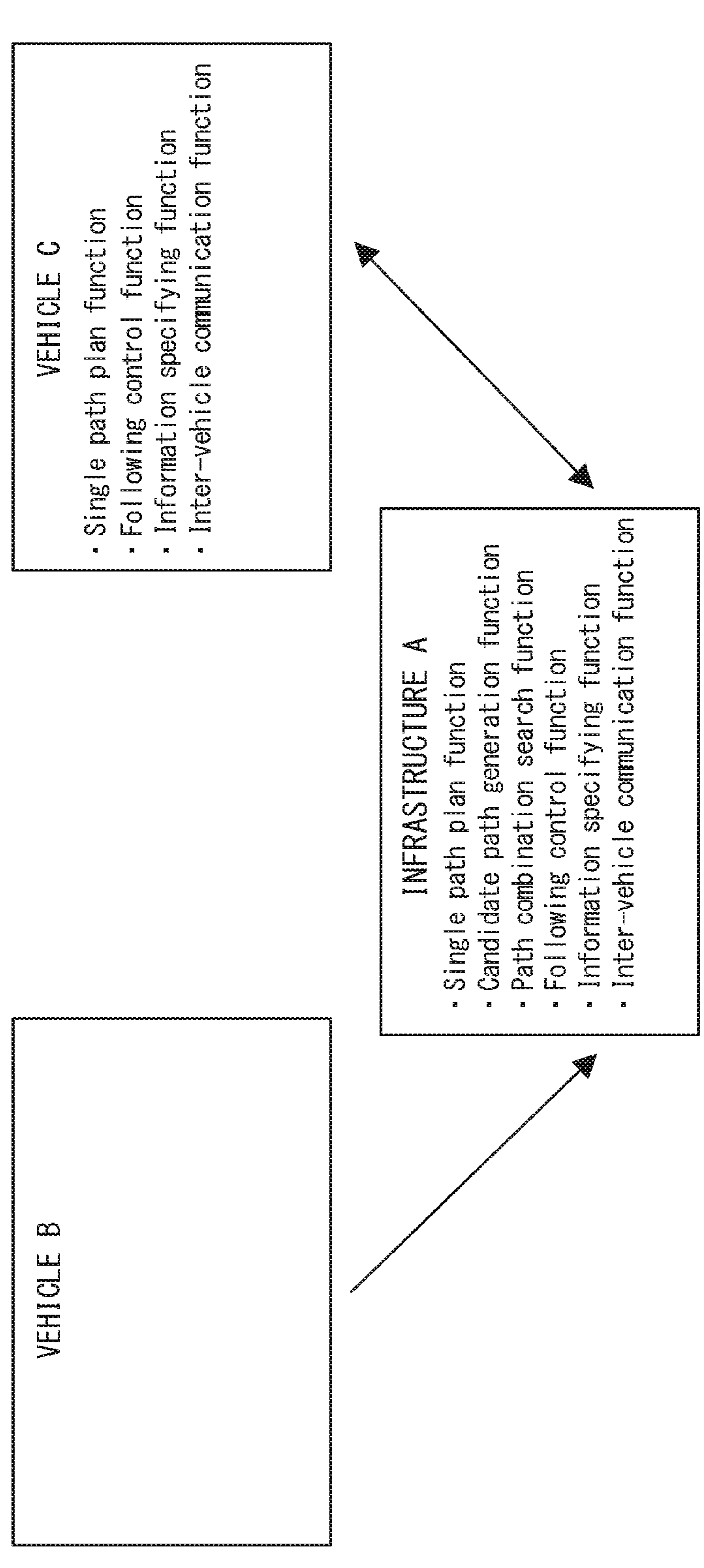
FIG. 29 is a diagram schematically showing a twelfth configuration example of a vehicle travel path planning system according to an embodiment of the present disclosure.
Figure 30:
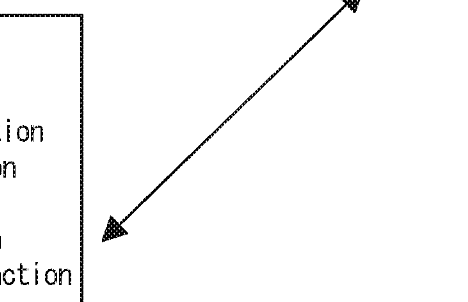
FIG. 30 is a diagram schematically showing a thirteenth configuration example of a vehicle travel path planning system according to an embodiment of the present disclosure.
Figure 31:
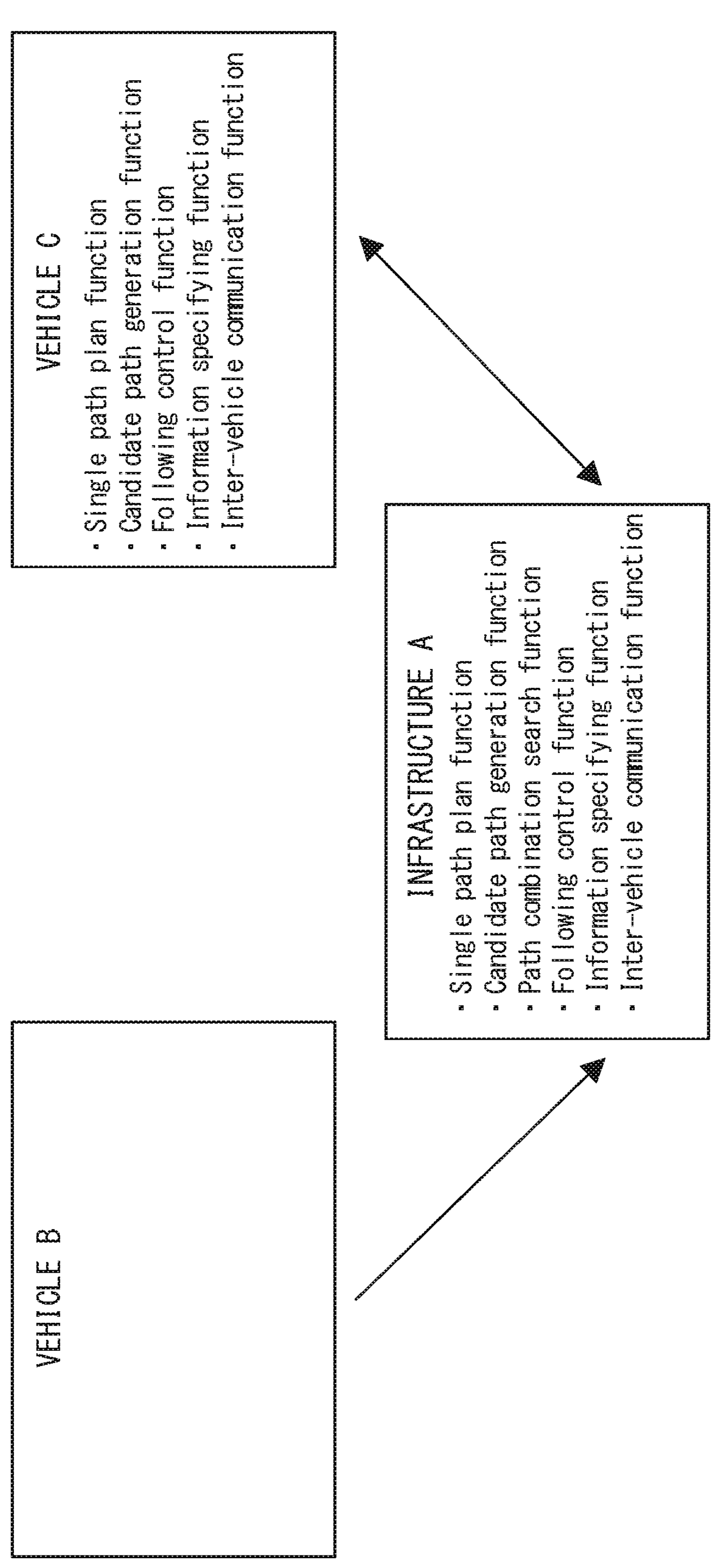
FIG. 31 is a diagram schematically showing a fourteenth configuration example of a vehicle travel path planning system according to an embodiment of the present disclosure.

The system configuration example illustrated in FIG. 25 is a configuration example in which the vehicle A is changed to an infrastructure A in the system configuration example illustrated in FIG. 18. The system configuration example illustrated in FIG. 26 is a configuration example in which the vehicle A is changed to an infrastructure A in the system configuration example illustrated in FIG. 19. The system configuration example illustrated in FIG. 27 is a configuration example in which the vehicle A is changed to an infrastructure A in the system configuration example illustrated in FIG. 20. The system configuration example illustrated in FIG. 28 is a configuration example in which the vehicle A is changed to an infrastructure A in the system configuration example illustrated in FIG. 21. The system configuration example illustrated in FIG. 29 is a configuration example in which the vehicle A is changed to an infrastructure A in the system configuration example illustrated in FIG. 22. The system configuration example illustrated in FIG. 30 is a configuration example in which the vehicle A is changed to an infrastructure A in the system configuration example illustrated in FIG. 23. The system configuration example illustrated in FIG. 31 is a configuration example in which the vehicle A is changed to an infrastructure A in the system configuration example illustrated in FIG. 24.

Figure 32:
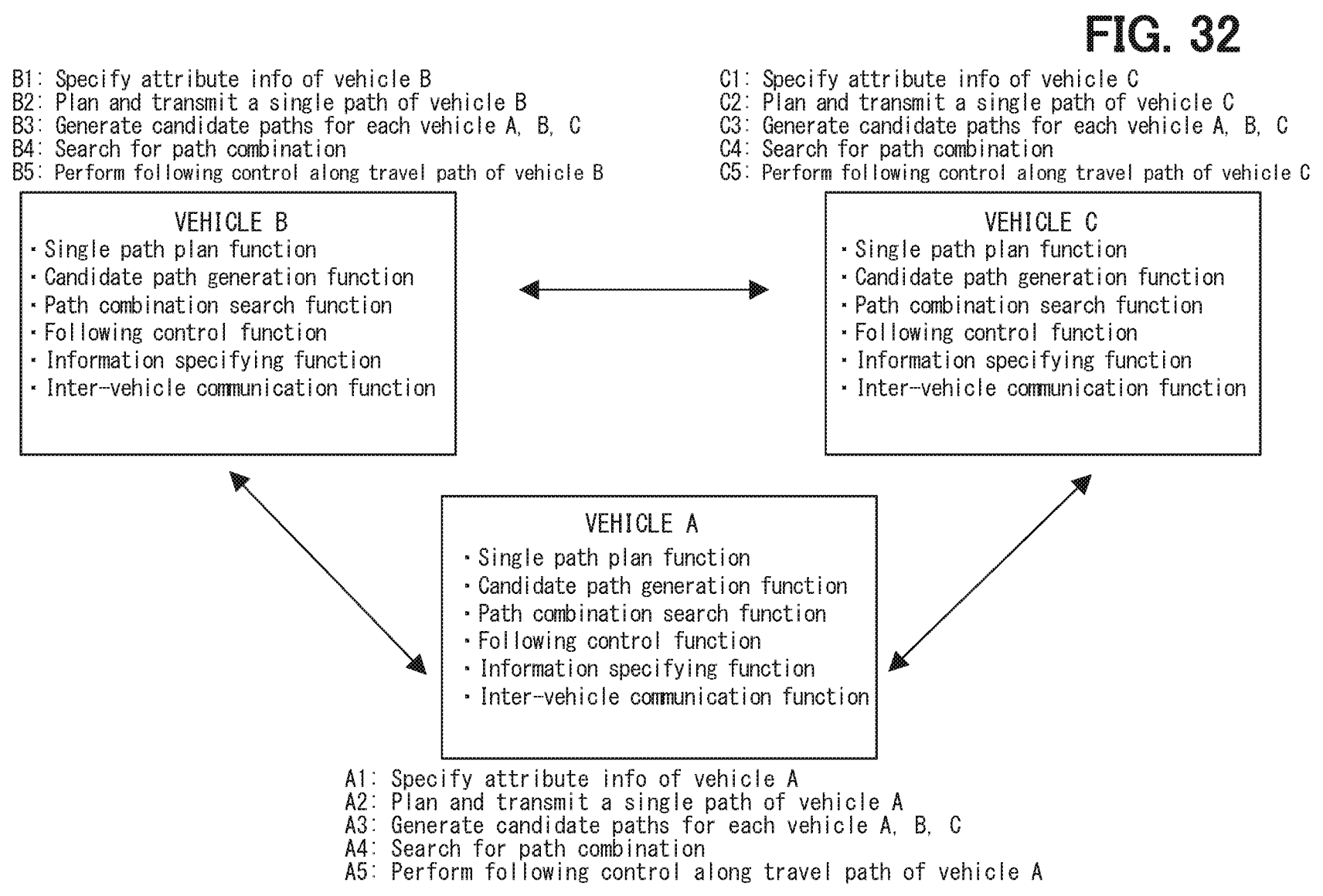

According to the system configuration example illustrated in FIG. 32, each of the vehicles A, B, C is equipped with the single path planning function, the candidate path generation function, the path combination search function, and the following control function of the system 10. Each of the vehicles A, B, C is equipped with an information specifying function for specifying vehicle attribute information, such as a position, a speed, and a movement intention of own vehicle. Each of the vehicles A, B, C is also equipped with an inter-vehicle communication function.

In the above system configuration example, in step (A1), the vehicle A specifies vehicle attribute information such as the position, speed, movement intention, or the like of own vehicle A. In step (B1), the vehicle B specifies vehicle attribute information such as the position, speed, movement intention, or the like of own vehicle B. In step (C1), the vehicle C specifies vehicle attribute information such as the position, speed, movement intention, or the like of own vehicle C.

In step (A2), the vehicle A plans a single path of own vehicle A, and transmits the planning result, that is, the planned single path to the vehicles B and C. In step (B2), the vehicle B plans a single path of own vehicle B, and transmits the planning result, that is, the planned single path to the vehicles A and C. In step (C2), the vehicle C plans a single path of own vehicle C, and transmits the planning result, that is, the planned single path to the vehicles A and B.

In step (A3), the vehicle A generates multiple candidate paths, that is, candidate path group similar to the planned single path of own vehicle A, generates multiple candidate paths, that is, candidate path group similar to the received single path of vehicle B, and generates multiple candidate paths, that is, candidate path group similar to the received single path of vehicle C. In step (B3), the vehicle B generates multiple candidate paths, that is, candidate path group similar to the planned single path of own vehicle B, generates multiple candidate paths, that is, candidate path group similar to the received single path of vehicle A, and generates multiple candidate paths, that is, candidate path group similar to the received single path of vehicle C. In step (C3), the vehicle C generates multiple candidate paths, that is, candidate path group similar to the planned single path of own vehicle B, generates multiple candidate paths, that is, candidate path group similar to the received single path of vehicle A, and generates multiple candidate paths, that is, candidate path group similar to the received single path of vehicle C.

In step (A4), the vehicle A uses the path combination search function to search for an optimal combination of travel paths for the candidate path group of own vehicle A generated by own vehicle and the candidate path groups of respective vehicles B and C received from other vehicles B and C. In step (B4), the vehicle B uses the path combination search function to search for an optimal combination of travel paths for the candidate path group of own vehicle B generated by own vehicle and the candidate path groups of respective vehicles A and C received from other vehicles A and C. In step (B4), the vehicle C uses the path combination search function to search for an optimal combination of travel paths for the candidate path group of own vehicle C generated by own vehicle and the candidate path groups of respective vehicles A and B received from other vehicles A and B.

Next, in step (A5), the vehicle A executes the following control such that the vehicle A travels along the own travel path included in the searched combination of travel paths. In step (B5), the vehicle B executes the following control such that the vehicle B travels along the own travel path included in the searched combination of travel paths. In step (C5), the vehicle C executes the following control such that the vehicle C travels along the own travel path included in the searched combination of travel paths.

Figure 33:
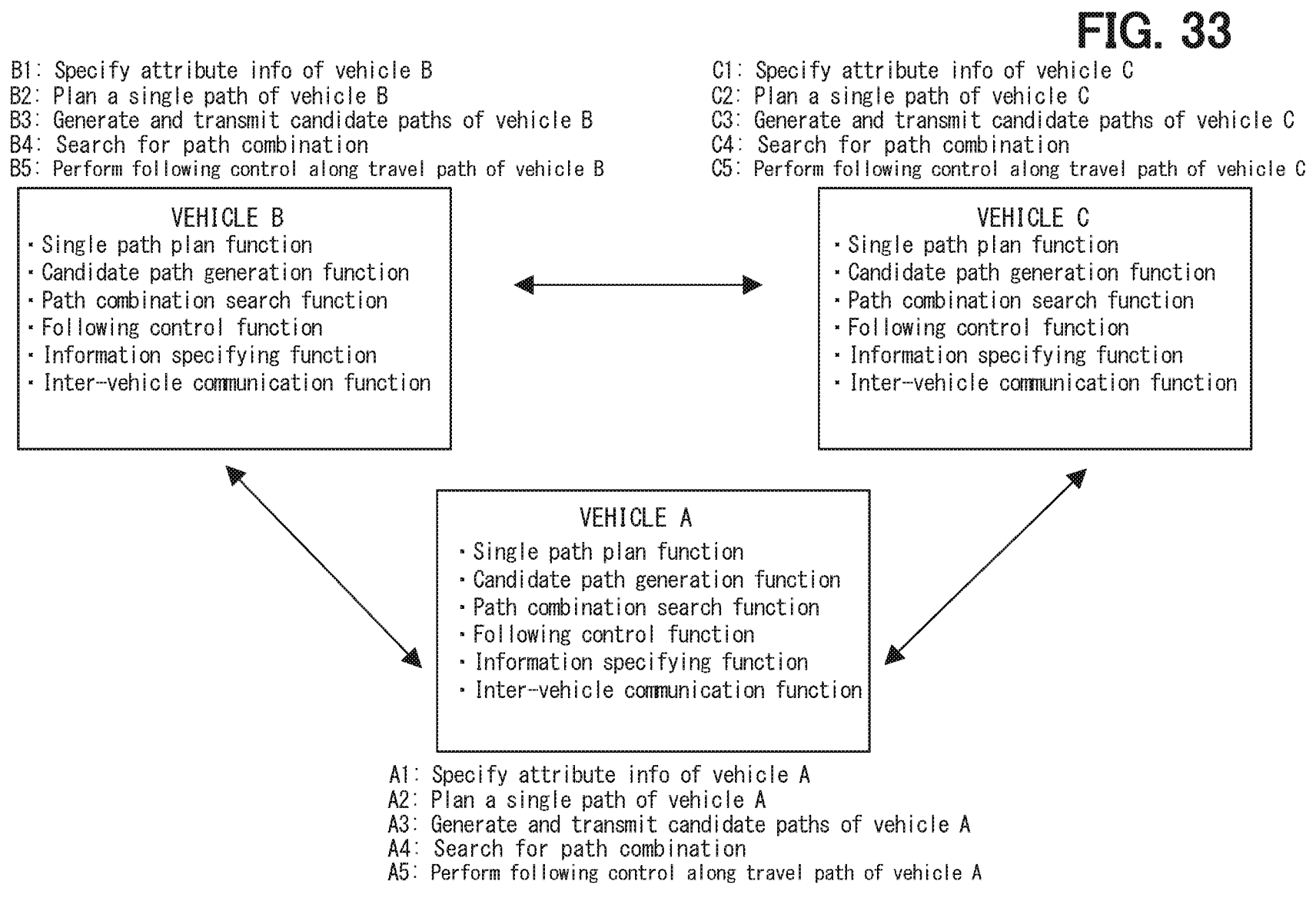

According to the system configuration example illustrated in FIG. 33, each of the vehicles A, B, C is equipped with the single path planning function, the candidate path generation function, the path combination search function, and the following control function of the system 10. Each of the vehicles A, B, C is equipped with an information specifying function for specifying vehicle attribute information, such as a position, a speed, and a movement intention of own vehicle. Each of the vehicles A, B, C is also equipped with an inter-vehicle communication function.

In the above system configuration example, in step (A1), the vehicle A specifies vehicle attribute information such as the position, speed, movement intention, or the like of own vehicle A. In step (B1), the vehicle B specifies vehicle attribute information such as the position, speed, movement intention, or the like of own vehicle B. In step (C1), the vehicle C specifies vehicle attribute information such as the position, speed, movement intention, or the like of own vehicle C.

Next, in step (A2), the vehicle A plans a single path of own vehicle A, based on the specified vehicle attribute information of own vehicle A. In step (B2), the vehicle B plans a single path of own vehicle B. In step (C2), the vehicle C plans a single path of own vehicle C.

Next, in step (A3), the vehicle A generates multiple candidate paths similar to the planned single path of own vehicle A, that is, generates a candidate path group, and transmits the generated result, that is, the generated candidate path group to the vehicles B and C. In step (B3), the vehicle B generates multiple candidate paths similar to the planned single path of own vehicle B, that is, generates a candidate path group, and transmits the generated result, that is, the generated candidate path group to the vehicles A and C. In step (C3), the vehicle C generates multiple candidate paths similar to the planned single path of own vehicle C, that is, generates a candidate path group, and transmits the generated result, that is, the generated candidate path group to the vehicles A and B.

In step (A4), the vehicle A uses the path combination search function to search for an optimal combination of travel paths for the candidate path group of own vehicle A generated by own vehicle and the candidate path groups of respective vehicles B and C received from other vehicles B and C. In step (B4), the vehicle B uses the path combination search function to search for an optimal combination of travel paths for the candidate path group of own vehicle B generated by own vehicle and the candidate path groups of respective vehicles A and C received from other vehicles A and C. In step (B4), the vehicle C uses the path combination search function to search for an optimal combination of travel paths for the candidate path group of own vehicle C generated by own vehicle and the candidate path groups of respective vehicles A and B received from other vehicles A and B.

Next, in step (A5), the vehicle A executes the following control such that the vehicle A travels along the own travel path included in the searched combination of travel paths. In step (B5), the vehicle B executes the following control such that the vehicle B travels along the own travel path included in the searched combination of travel paths. In step (C5), the vehicle C executes the following control such that the vehicle C travels along the own travel path included in the searched combination of travel paths.

The vehicle travel path planning system 10 exemplified above includes the single path planning function unit 11 that plans one travel path as a single path for each vehicle, the candidate path generation function unit 12 that generates multiple candidate paths similar to the single path for each vehicle, and the combination search function unit 13 that selects an optimal travel path from the multiple candidate paths of each vehicle and searches for a combination of optimal travel paths for the entire vehicles included in the vehicle group. According to this configuration, it is possible to search for an optimal combination of travel paths for the entire vehicles included in the vehicle group.

According to the vehicle travel path planning system 10, the candidate path generation function unit 12 may be configured to generate multiple candidate paths for each vehicle in consideration of a relationship between candidate paths of one vehicle and candidate paths of another vehicle. According to this configuration example, it is possible to generate the candidate paths such that the diversity of the compatibility with the candidate paths of another vehicle is increased in consideration of the lane selection intention of the vehicle, the environment situation of the vehicle, or the like. The compatibility with the candidate paths of another vehicle may be a relationship such as a parallel traveling relationship between the travel lane in which the own vehicle travels and the travel lane in which another vehicle travels, or a front-rear relationship between own vehicle and another vehicle traveling in the same lane.

In the vehicle travel path planning system 10, the candidate path generation function unit 12 may be configured to generate a path that maintains the current travel lane and travel speed of one vehicle, and then generates a path to additionally include a lane change at a proper timing with respect to the generated path, as the candidate path. In the vehicle travel path planning system 10, the candidate path generation function unit 12 may be configured to generate a path that maximizes a distance between one vehicle and another vehicle existing in front of or behind the one vehicle, and generate a path to additionally include acceleration or deceleration at a proper timing with respect to the generated path, as the candidate path. In the vehicle travel path planning system 10, the candidate path generation function unit 12 may be configured to generate a path that requires one vehicle to make lane change to a free lane with few vehicles, and generate a path to additionally include acceleration or deceleration at a proper timing with respect to the generated path, as the candidate path. In the vehicle travel path planning system 10, the candidate path generation function unit 12 may be configured to generate, as the candidate path, at least one of a path in which one vehicle is accelerated to travel in front of another vehicle closest to the one vehicle by overtaking another vehicle or a path in which one vehicle is decelerated to travel behind another vehicle closest to the one vehicle.

With this configuration, as illustrated in the simulation example described above, it is possible to easily search for a combination of optimal travel paths for the entire vehicles included in the vehicle group. Furthermore, it is preferable to search for an optimal combination of travel paths by a known combination optimization solver.

According to the vehicle travel path planning system 10, the candidate path generation function unit 12 and the combination search function unit 13 can be appropriately distributed in vehicles and traffic infrastructure facilities. For example, the single path planning function unit 11 may be mounted on a vehicle or may be mounted on a traffic infrastructure facility. The candidate path generation function unit 12 may be mounted on a vehicle or may be mounted on a traffic infrastructure facility. The combination search function unit 13 may be mounted on a vehicle or may be mounted on a traffic infrastructure facility. The following control function unit 14 may be mounted on the vehicle or may be mounted on a traffic infrastructure facility. The following control function unit 14 may be mounted on a computer of a cloud environment by connecting a cloud with a vehicle or a traffic infrastructure by wireless communication.

In the vehicle travel path planning system 10, the candidate path generation function unit 12 may be configured to search for an optimal combination of travel paths for avoiding a collision of vehicles, or search for an optimal combination of travel paths for suppressing fuel efficiency of the multiple vehicles.

In the vehicle travel path planning system 10, the combination search function unit 13 may be preferably configured to search for an optimal combination of travel paths using a high-performance computer, such as a quantum inspired computer. The combination search function unit 13 is not limited to the quantum inspired computer, and may be configured by another information processing device under a condition that an optimal combination of travel paths can be searched for.

The present disclosure can be applied to various traffic scenes that include multiple vehicles, such as an intersection, an entrance or exit of an expressway, a merging point of an expressway, or a branching point of an expressway. The present disclosure can also be applied to various traffic scenes that include a moving object other than a vehicle, such as a case where a pedestrian or a bicycle is present on a side road or a case where a pedestrian is present on a crosswalk.

Figure 34:
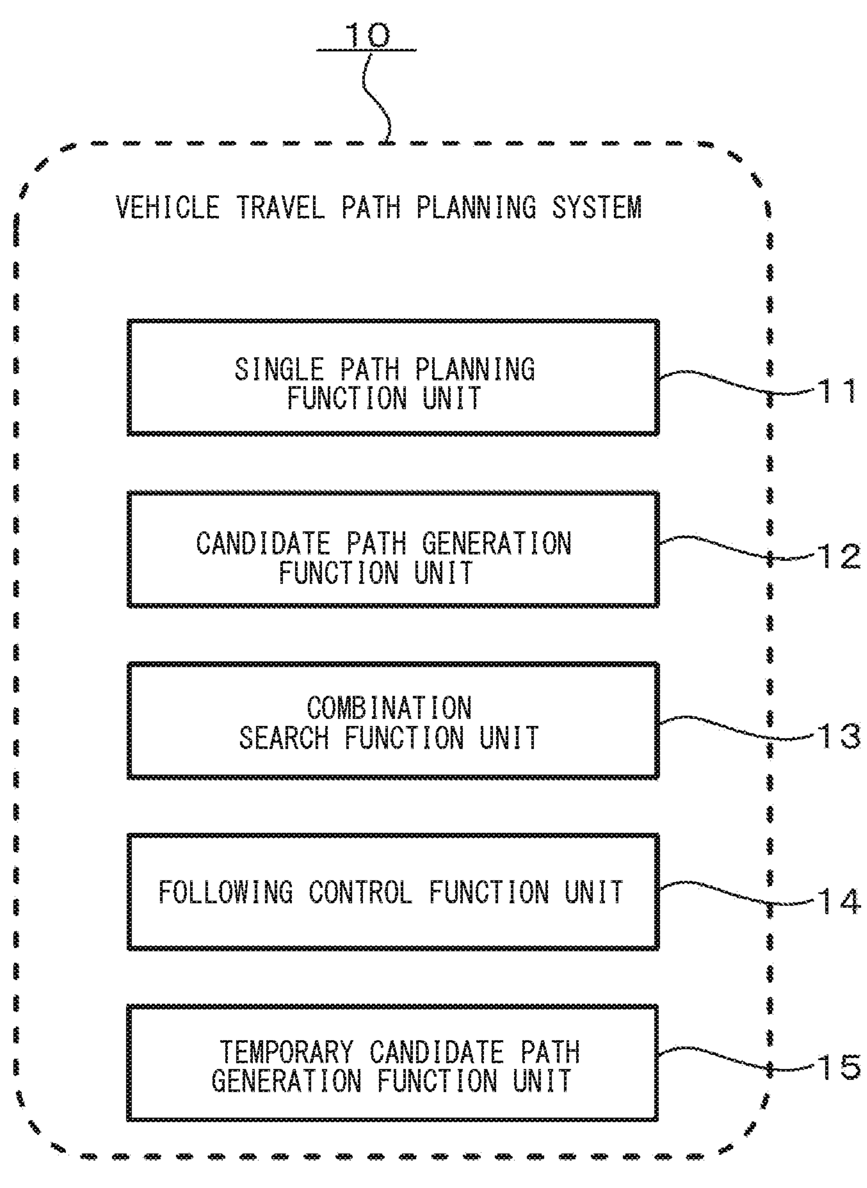
FIG. 34 is a diagram schematically showing a configuration example of a vehicle travel path planning system according to a modified embodiment of the present disclosure.

The following will describe an improved embodiment of the present disclosure. According to the improved configuration example illustrated in FIG. 34, the vehicle travel path planning system 10 further includes a temporary candidate path generation function unit 15. The temporary candidate path generation function unit 15 may be virtually implemented in software manner by executing a predetermined program on an information processing device such as a computer. The temporary candidate path generation function unit 15 may be implemented by hardware or a combination of software and hardware.

The temporary candidate path generation function unit 15 is an example of a temporary candidate path generation unit, and can execute a temporary candidate path generation process. The temporary candidate path generation process is a process of generating a temporary candidate path for an uncontrolled vehicle when both of a controlled vehicle and the uncontrolled vehicle exist. The controlled vehicle is a vehicle for which the candidate path group generation functional unit 12 can generate a candidate path group. The uncontrolled vehicle is a vehicle for which the candidate path group generation functional unit 12 cannot generate a candidate path group.

As illustrated in FIG. 35, in a traffic scene where multiple moving objects exist, there may be a mixture of controlled vehicle for which the candidate path generation function unit 12 can generate a candidate path group and uncontrolled vehicle for which the candidate path generation function unit 12 cannot generate a candidate path group. The controlled vehicle is a moving object whose position information, speed information, movement intention information, or the like can be specified. The uncontrolled vehicle is a moving object whose position information, speed information, movement intention information, or the like cannot be specified. For example, a moving object such as a motorcycle, a bicycle, or a pedestrian, that is, a moving object that does not include a positioning device, a speed sensor, or the like corresponds to the uncontrolled vehicle.

When such an uncontrolled vehicle exists, the temporary candidate path generation function unit 15 generates temporary candidate paths for the uncontrolled vehicle. Existence of an uncontrolled vehicle may be determined by, for example, analyzing an environment image using a vehicle-mounted camera of the vehicle on which the vehicle travel path planning system 10 is mounted, or analyzing an environment situation using a radar device of the vehicle on which the vehicle travel path planning system 10 is mounted. Thus, existence of a moving object for which the candidate path group cannot be generated by the candidate path generation function unit 12 can be determined. For example, as a result of the analysis, in a case where there are only two moving objects for each of which the candidate path can be generated based on the position information, the speed information, the movement intention information, even though three moving objects are confirmed, it can be determined that the remaining one moving object is the uncontrolled vehicle.

Figure 36:
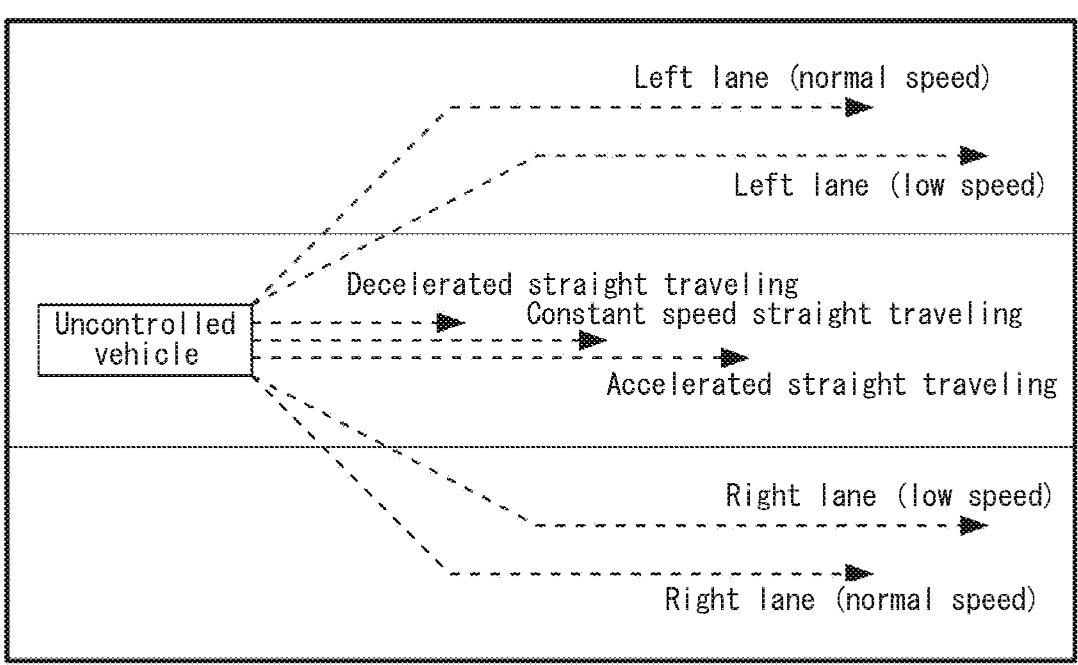
FIG. 36 is a diagram schematically showing an example of temporary candidate path group generated by a temporary candidate path generation function unit according to a modified embodiment of the present disclosure.

FIG. 36 illustrates an example of the temporary candidate path group generated by the temporary candidate path generation function unit 15. It is conceivable that the uncontrolled vehicle can take various paths, such as decelerated straight traveling, constant speed straight traveling, accelerated straight traveling, lane change to the left lane at normal speed, lane change to the left lane at low speed, lane change to the right lane at normal speed, and lane change to the right lane at low speed. The temporary candidate path generation function unit 15 generates multiple possible paths for the uncontrolled vehicle as temporary candidate paths. The temporary candidate path generation function unit 15 may generate the temporary candidate path in consideration of a case where the uncontrolled vehicle suddenly stops or suddenly starts moving.

Then, the combination search function unit 13 selects an optimal travel path from the candidate path group generated by the candidate path generation function unit 12 and the temporary candidate path group generated by the temporary candidate path generation function unit 15, and searches for a combination of optimal travel paths for the entire vehicles including the controlled vehicles and the uncontrolled vehicles. As a result, for the controlled vehicle, it is possible to search for a travel path that ensures a sufficient inter-vehicle distance between the controlled vehicle and the uncontrolled vehicle or to search for a travel path that enables the controlled to travel by avoiding the uncontrolled vehicle.

FIG. 37 illustrates an example of derivation of cost function H (σ) according to the improved embodiment. In the derivation example illustrated in FIG. 11, the cost function of a single path of the controlled vehicle and the cost function of path pair between two vehicles are considered. In the improved embodiment, in addition to the derivation example illustrated in FIG. 11, the cost function of path pair between the controlled vehicle and the uncontrolled vehicle is also considered. For the uncontrolled vehicle, an expected value is calculated by multiplying occurrence probability of each temporary candidate path as a weight, and the sum of expected values is obtained. The occurrence probability is a probability that the uncontrolled vehicle actually travels a certain temporary candidate path. The occurrence probability can be set based on, for example, data obtained by a demonstration experiment or the like. The combination search function unit 13 derives, as an optimal combination search solution, a combination of paths that minimizes the cost function illustrated in FIG. 37.

Specifically, in the following formula 14, a cost function (expected value F1 of the cost function) obtained by summing values obtained by multiplying the costs of all the temporary candidate paths by the occurrence probabilities (weights) is minimized.

$$F_1[t_1, t_2, \ldots, t_N] = A\sum_{i} L[t_i] + B\sum_{\{i_1<i_2\}} Q[t_{i1}, t_{i2}] + C\sum_{i,j}\sum_{i} p_{j,l} Q[t_i, t'_{j,l}] \quad \text{(Formula 14)}$$

In formula 14, the first term represents a cost function of single path (L) of a controlled vehicle, the second term represents a cost function of a path pair (Q) of multiple vehicles, and the third term represents a cost function of a path pair of a controlled vehicle and an uncontrolled vehicle (for multiple predicted paths of an uncontrolled vehicle, an expected value is calculated by multiplying weights of probabilities).

In formula 14, the definition of each symbol is as follows.

t: index of a path of controlled vehicle.

t': index of a path of uncontrolled vehicle.

$t'_{j,l}$: indicates the l-th temporary path of the j-th uncontrolled vehicle.

p: probability indicating that the uncontrolled vehicle actually travels on a certain temporary candidate path.

$p_{j,l}$: probability indicating that the uncontrolled vehicle actually travels on the l-th temporary path of the j-th uncontrolled vehicle.

A, B, C: arbitrary constant. FIG. 38 illustrates another example of derivation of cost function H(σ) in the improved embodiment. In the improved embodiment, in addition to the derivation example illustrated in FIG. 11, the cost function of path pair between the controlled vehicle and the uncontrolled vehicle is also considered. For the uncontrolled vehicle, the least preferable case, that is, the case in which the calculation result of the cost by the predetermined function is the maximum is obtained for the multiple temporary candidate paths. In this case, the predetermined function is a Max function for obtaining the maximum value of the cost. The combination search function unit 13 derives, as an optimal combination search solution, a combination of paths that minimizes the cost function illustrated in FIG. 38.

Specifically, in the following formula 15, the cost function (the expected value F2 of the cost function) in which the cost of the least preferable temporary candidate path among all of the temporary candidate paths is reflected is minimized.

$$F_2[t_1, t_2, \ldots, t_N] = A\sum_i L[t_i] + B\sum_{\{i_1<i_2\}} Q[t_{i1}, t_{i2}] + C\sum_{i,j}\sum_i \mathrm{Max}_l(Q[t_i, t'_{j,l}]) \quad \text{(Formula 15)}$$

In formula 15, the first term represents a cost function of single path (L) of a controlled vehicle, the second term represents a cost function of a path pair (Q) of multiple vehicles, and the third term represents a cost function of a path pair of a controlled vehicle and an uncontrolled vehicle (for multiple predicted paths of an uncontrolled vehicle, the worst case is calculated).

In formula 15, the definition of each symbol is as follows.

t: index of a path of controlled vehicle.

t': index of a path of uncontrolled vehicle.

$t'_{j,l}$: indicates the l-th temporary path of the j-th uncontrolled vehicle.

A, B, C: arbitrary constant.

The least preferable case is a case where the calculation result of the cost by the Max function is maximized.

Figure 39:
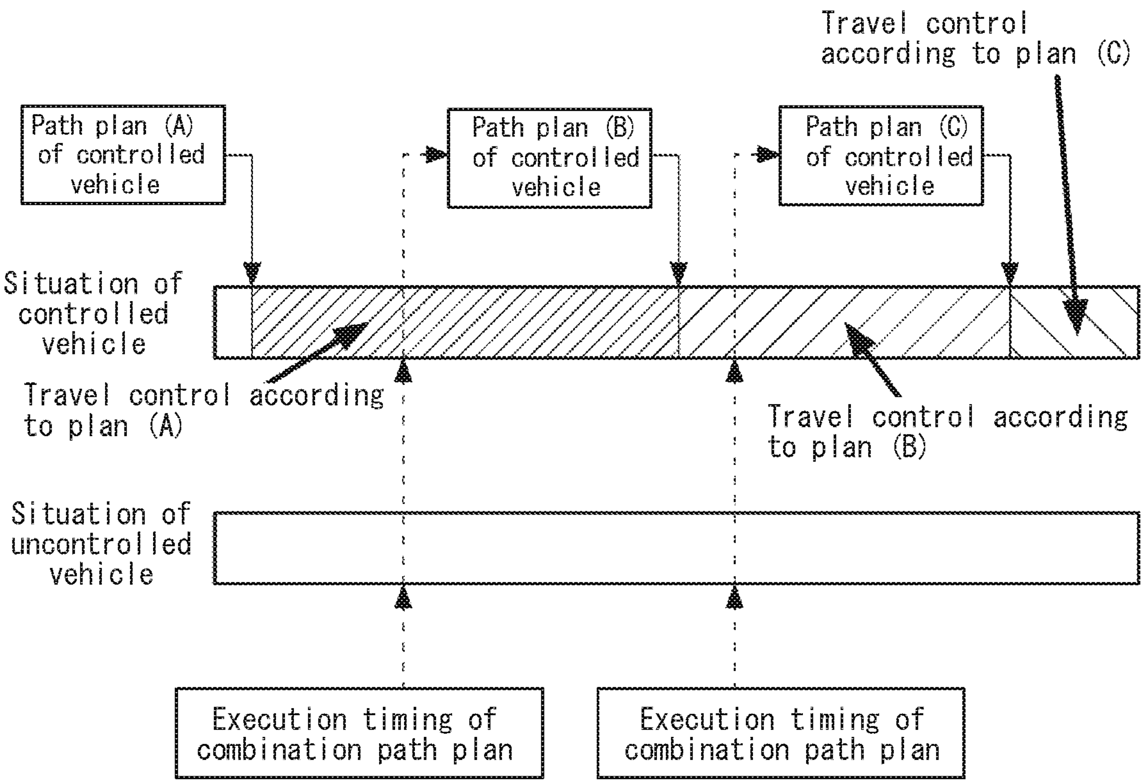
FIG. 39 is a diagram schematically showing a repeated execution of a search process for an optimal combination of travel paths at necessary timings according to a modified embodiment of the present disclosure.

As illustrated in FIG. 39, the combination search function unit 13 may repeatedly execute a process of searching for an optimal combination of travel paths for the entire vehicles included in the vehicle group at a proper timing. The proper timing is, for example, a timing when an environment situation of the vehicle on which the vehicle travel path planning system 10 is mounted or an environment situation of a predetermined vehicle discontinuously changes, or a timing when the changed state continues for a predetermined duration or longer. The predetermined duration can be appropriately changed and set according to an order of, for example, several seconds, several minutes, or several hours. The environment situation of the vehicle can be determined by, for example, a vehicle-mounted camera, a radar device, or the like mounted on a predetermined vehicle or traffic infrastructure.

The vehicle travel path planning system 10 may be implemented in an edge. The edge is, for example, a traffic infrastructure such as a vehicle or a traffic light, that is, the edge is a concept including all things constituting an end of the system. Implementing the vehicle travel path planning system 10 in the edge means that cloud computing is not utilized. Estimation of the processing time when the vehicle travel path planning system 10 is implemented in the edge is, for example, 20 milliseconds for the generation processing of the candidate path group, 100 milliseconds for the cost calculation of the path and the path pair, 200 milliseconds for the combined path search processing by the quantum inspired computer, and 100 milliseconds for the path planning processing by MPC (Model Predictive Control) of each vehicle, and is estimated to be about 420 milliseconds in total. MPC is a well-known predictive control technique that performs optimization while predicting future behavior.

In order to obtain rapidity and immediacy of the processing in the vehicle travel path planning system 10, it is necessary to speed up the processing of generating the candidate paths and the temporary candidate paths. Therefore, for example, it is preferable to execute the predictions of the constant speed straight traveling, the acceleration/deceleration traveling, the lane change traveling, and the like illustrated in FIG. 40 in combination as appropriate.

For example, in the prediction of performing the constant speed straight traveling, the following formula 16 is satisfied.

$$\begin{pmatrix} x(t) \\ y(t) \end{pmatrix} = \begin{pmatrix} x(0) + v_x t \\ y(0) \end{pmatrix} \quad \text{(Formula 16)}$$
$$\begin{pmatrix} \dot{x}(t) \\ \dot{y}(t) \end{pmatrix} = \begin{pmatrix} v_x \\ 0 \end{pmatrix}$$

For example, in the prediction of performing acceleration/deceleration traveling, the following formula 17 is satisfied.

$$\begin{pmatrix} x(t) \\ y(t) \end{pmatrix} = \begin{pmatrix} x(0) + v_x t + a_x t^2/2 \\ y(0) \end{pmatrix} \quad \text{(Formula 17)}$$
$$\begin{pmatrix} \dot{x}(t) \\ \dot{y}(t) \end{pmatrix} = \begin{pmatrix} v_x + a_x t \\ 0 \end{pmatrix}$$

For example, in the prediction of performing speed change traveling, the following formula 18 is satisfied.

$$\begin{pmatrix} x(t) \\ y(t) \end{pmatrix} = \begin{pmatrix} x(0) + v_x t \\ y(0) + v_y t \end{pmatrix} \quad \text{(Formula 18)}$$
$$\begin{pmatrix} \dot{x}(t) \\ \dot{y}(t) \end{pmatrix} = \begin{pmatrix} v_x \\ v_y \end{pmatrix}$$

Although the present disclosure has been described according to the embodiments, it is understood that the present disclosure is not limited to the above-described embodiments or structures. The present disclosure includes various modification examples and equivalents thereof. Furthermore, various combination and configuration, and other combination and configuration including one, more than one or less than one element may be made in the present disclosure.

The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured with one or more hardware logic circuits. The computer program may be stored in a computer-readable non-transitory tangible storage medium as instructions to be executed by a computer.

What is claimed is:

1. A vehicle travel path planning system planning an optimal combination of travel paths for all of multiple vehicles included in a vehicle group, the vehicle travel path planning system comprising:

a single path planning circuit planning, as a single path, one travel path for each of the multiple vehicles;

a candidate path generation circuit generating, for each of the multiple vehicles, multiple candidate paths collectively, which are similar to the single path planned for each of the multiple vehicles; and a combination search circuit selecting an optimal travel path from the multiple candidate paths generated for each of the multiple vehicles and searching for an optimal travel path combination for all of the multiple vehicles included in the vehicle group; and an information specifying circuit that specifies vehicle attribute information including position information, speed information, and movement intention information of each of the multiple vehicles, wherein the single path planning circuit plans the single path for each of the multiple vehicles based on the vehicle attribute information specified by the information specifying circuit, and the candidate path generation circuit generates, for each of the multiple vehicles, the multiple candidate paths based on the position information, speed information, and movement intention information, which are specified by the information specifying circuit as the vehicle attribute information.

2. The vehicle travel path planning system according to claim 1, wherein the candidate path generation circuit generates the multiple candidate paths for each of the multiple vehicles in consideration of a relationship between the multiple candidate paths of one of the multiple vehicles and the multiple candidate paths of another one of the multiple vehicles.

3. The vehicle travel path planning system according to claim 2, wherein the candidate path generation circuit generates a path that maintains a current travel lane and a current travel speed of one of the multiple vehicles, and then generates, as one of the multiple candidate paths of the one of the multiple vehicles, a path to additionally include a lane change at a proper timing with respect to the generated path.

4. The vehicle travel path planning system according to claim 2, wherein the candidate path generation circuit generates a path that maximizes a distance between one of the multiple vehicles and a periphery vehicle existing in front of or behind the one of the multiple vehicles, and generates, as one of the multiple candidate paths of the one of the multiple vehicles, a path to additionally include acceleration or deceleration at a proper timing with respect to the generated path.

5. The vehicle travel path planning system according to claim 2, wherein the candidate path generation circuit generates a path that requires one of the multiple vehicles to make a lane change to a free lane with few traffic, and generates, as one of the multiple candidate paths of the one of the multiple vehicles, a path to additionally include acceleration or deceleration at a proper timing with respect to the generated path.

6. The vehicle travel path planning system according to claim 2, wherein the candidate path generation circuit generates, as the multiple candidate paths for one of the multiple vehicles, a path in which the one of the multiple vehicles is accelerated to travel in front of another vehicle closest to the one of the multiple vehicles and a path in which the one of the multiple vehicles is decelerated to travel behind another vehicle closest to the one of the multiple vehicles.

7. The vehicle travel path planning system according to claim 2, further comprising a temporary candidate path generation circuit generating one or more temporary candidate paths for an uncontrolled vehicle in a situation where both of a controlled vehicle and the uncontrolled vehicle exist, wherein the controlled vehicle is a vehicle for which the candidate path generation circuit can generate the multiple candidate paths, and the uncontrolled vehicle is a vehicle for which the candidate path generation circuit fails to generate the multiple candidate paths, and the combination search circuit unit selects the optimal travel paths from the multiple candidate paths generated by the candidate path generation circuit and the one or more temporary candidate paths generated by the temporary candidate path generation circuit, and searches for the optimal travel path combination for all of the multiple vehicles including the controlled vehicle and the uncontrolled vehicle.

8. The vehicle travel path planning system according to claim 1, wherein the combination search circuit searches for the optimal travel path combination using a combination optimization solver.

9. The vehicle travel path planning system according to claim 8, wherein the combination search circuit is mounted on one of the multiple vehicles.

10. The vehicle travel path planning system according to claim 8, wherein the combination search circuit is mounted on a traffic infrastructure.

11. The vehicle travel path planning system according to claim 8, wherein the candidate path generation circuit is mounted on one of the multiple vehicles.

12. The vehicle travel path planning system according to claim 8, wherein the candidate path generation circuit is mounted on a traffic infrastructure.

13. The vehicle travel path planning system according to claim 8, wherein the combination search circuit repeatedly executes a process of searching for the optimal travel path combination for all of the vehicles included in the vehicle group at a necessary timing.

14. The vehicle travel path planning system according to claim 1, wherein the combination search circuit searches for the optimal travel path combination that can avoid a collision of the multiple vehicles, or searches for the optimal travel path combination that can suppress fuel efficiencies of the multiple vehicles.

15. The vehicle travel path planning system according to claim 14, wherein the combination search circuit searches for the optimal travel path combination using a quantum inspired computer.

16. The vehicle travel path planning system according to claim 1, wherein the position information is acquired by a positioning device equipped to each of the multiple vehicles, the speed information is acquired by a speed sensor equipped to each of the multiple vehicles, and the movement intention information is acquired based on a manipulation state of a direction indicator equipped to each of the multiple vehicles, a manipulation state of a steering wheel equipped to each of the multiple vehicles, or an operation state of a vehicle navigation system equipped to each of the multiple vehicles.

17. The vehicle travel path planning system according to claim 1, wherein one of the multiple vehicles include a following control circuit that performs a following travel control, and the following control circuit controls an autonomous driving of the one of the multiple vehicles according to the optimal travel path included in the optimal travel path combination searched by the combination search circuit.

18. The vehicle travel path planning system according to claim 1, wherein the single path planning circuit plans the single path for each of the multiple vehicles based on the position information, speed information, and movement intention, which are specified by the information specifying circuit as the vehicle attribute information.

* * * * *